US011564110B2

(12) United States Patent
Stapleton et al.

(10) Patent No.: US 11,564,110 B2
(45) Date of Patent: *Jan. 24, 2023

(54) SOFT HAND-OFF AND ROUTING DATA IN A VIRTUALIZED DISTRIBUTED ANTENNA SYSTEM

(71) Applicant: DALI SYSTEMS CO. LTD., Grand Cayman (KY)

(72) Inventors: Shawn Patrick Stapleton, Palo Alto, CA (US); Daryl Meerkerk, Palo Alto, CA (US)

(73) Assignee: DALI WIRELESS, INC., Menlo Park, CA (US)

( * ) Notice: Subject to any disclaimer, the term of this patent is extended or adjusted under 35 U.S.C. 154(b) by 813 days.

This patent is subject to a terminal disclaimer.

(21) Appl. No.: 13/670,162

(22) Filed: Nov. 6, 2012

(65) Prior Publication Data
US 2013/0114963 A1 May 9, 2013

Related U.S. Application Data

(60) Provisional application No. 61/556,685, filed on Nov. 7, 2011, provisional application No. 61/556,689, filed on Nov. 7, 2011.

(51) Int. Cl.
*H04W 24/02* (2009.01)
*H04W 16/10* (2009.01)
(Continued)

(52) U.S. Cl.
CPC ............ *H04W 24/02* (2013.01); *H04W 16/10* (2013.01); *H04W 40/00* (2013.01);
(Continued)

(58) Field of Classification Search
CPC . H04W 24/02; H04W 52/0206; H04W 16/10; H04W 88/085; H04W 40/00; Y02B 60/50
See application file for complete search history.

(56) References Cited

U.S. PATENT DOCUMENTS 3,854,122 A 12/1974 Cross
4,955,075 A * 9/1990 Anderson ......... H04W 52/0283
455/182.2
(Continued)

FOREIGN PATENT DOCUMENTS

CA 2306064 A 10/2000
CN 100544458 C 9/2009
(Continued)

OTHER PUBLICATIONS

Notification Of Transmittal Of The International Search Report And The Written Opinion Of The International Searching Authority, Or The Declaration; International Search Report and Written Opinion Of The International Searching Authority for corresponding International application No. PCT/US2012/063721 dated Jan. 18, 2013, 11 pages.

(Continued)

*Primary Examiner* — Sai Aung
*Assistant Examiner* — Wilfred Thomas
(74) *Attorney, Agent, or Firm* — Artegis Law Group, LLP

(57) ABSTRACT

In some embodiments of the invention, a system for managing resource use in a Distributed Antenna System is provided. The system may include: a plurality of Digital Remote Units (DRUs) configured to send and receive wireless radio signals; a plurality of sectors, each configured to send and receive wireless radio signals; and a plurality of inter-connected Digital Access Units (DAUs), each configured to communicate with at least one of the DRUs via optical signals, and each being coupled to at least one of the sectors.

17 Claims, 22 Drawing Sheets

(51) Int. Cl.
  *H04W 40/00*  (2009.01)
  *H04W 52/02*  (2009.01)
  *H04W 88/08*  (2009.01)

(52) U.S. Cl.
  CPC ...... *H04W 52/0206* (2013.01); *H04W 88/085* (2013.01); *Y02D 30/70* (2020.08)

(56) References Cited

U.S. PATENT DOCUMENTS

| | | | |
|---|---|---|---|
| 5,142,550 A * | 8/1992 | Tymes | H04B 1/707 |
| | | | 375/141 |
| 5,805,983 A | 9/1998 | Naidu et al. | |
| 5,848,060 A | 12/1998 | Dent | |
| 5,867,763 A * | 2/1999 | Dean et al. | 725/114 |
| 6,167,286 A * | 12/2000 | Ward | H01Q 1/246 |
| | | | 455/132 |
| 6,308,085 B1 | 10/2001 | Shoki | |
| 6,628,958 B1 * | 9/2003 | Kamel | H04W 52/40 |
| | | | 370/331 |
| 6,704,545 B1 | 3/2004 | Wala | |
| 6,785,558 B1 * | 8/2004 | Stratford | H04L 1/0625 |
| | | | 455/522 |
| 6,801,767 B1 | 10/2004 | Schwartz et al. | |
| 7,286,507 B1 | 10/2007 | Oh et al. | |
| 7,339,897 B2 | 3/2008 | Larsson et al. | |
| 7,493,129 B1 * | 2/2009 | Mostafa | H04W 56/0045 |
| | | | 455/502 |
| 7,590,354 B2 * | 9/2009 | Sauer et al. | 398/115 |
| 7,639,982 B2 | 12/2009 | Wala | |
| 7,738,381 B2 | 6/2010 | Wiggins et al. | |
| 7,937,110 B2 | 5/2011 | Wu et al. | |
| 8,310,963 B2 | 11/2012 | Singh | |
| 8,346,091 B2 | 1/2013 | Kummetz et al. | |
| 8,346,160 B2 | 1/2013 | Kummetz et al. | |
| 8,498,207 B2 | 7/2013 | Trigui et al. | |
| 8,532,242 B2 | 9/2013 | Fischer et al. | |
| 8,548,330 B2 | 10/2013 | Berlin et al. | |
| 8,583,100 B2 | 11/2013 | Koziy et al. | |
| 8,583,137 B2 | 11/2013 | Rezaiifar et al. | |
| 8,681,917 B2 | 3/2014 | McAllister et al. | |
| 8,693,342 B2 | 4/2014 | Uyehara et al. | |
| 8,743,718 B2 | 6/2014 | Grenier et al. | |
| 8,743,756 B2 | 6/2014 | Uyehara et al. | |
| 8,743,759 B2 | 6/2014 | Viswanathan et al. | |
| 8,744,504 B2 | 6/2014 | Faccin et al. | |
| 8,837,659 B2 | 9/2014 | Uyehara et al. | |
| 8,837,940 B2 * | 9/2014 | Smith et al. | 398/45 |
| 8,929,950 B2 | 1/2015 | Kobayashi et al. | |
| 8,958,789 B2 | 2/2015 | Bauman et al. | |
| 9,112,549 B2 | 8/2015 | Stapleton | |
| 9,176,321 B2 | 11/2015 | Olivieri | |
| 9,178,636 B2 | 11/2015 | Fischer et al. | |
| 9,179,321 B2 | 11/2015 | Hasarchi et al. | |
| 9,219,520 B2 | 12/2015 | Uyehara et al. | |
| 9,246,559 B2 | 1/2016 | Tarlazzi et al. | |
| 9,398,464 B2 | 7/2016 | Kummetz et al. | |
| 9,420,628 B2 | 8/2016 | Spedaliere et al. | |
| 9,439,242 B2 | 9/2016 | Stapleton et al. | |
| 9,787,457 B2 | 10/2017 | Zavadsky et al. | |
| 10,020,850 B2 | 7/2018 | Wala et al. | |
| 10,045,314 B2 | 8/2018 | Stapleton et al. | |
| 10,637,537 B2 | 4/2020 | Stapleton et al. | |
| 2001/0037395 A1 | 11/2001 | Sabat, Jr. et al. | |
| 2002/0093926 A1 | 7/2002 | Kilfoyle | |
| 2002/0187809 A1 | 12/2002 | Mani et al. | |
| 2004/0004943 A1 | 1/2004 | Kim et al. | |
| 2004/0203339 A1 * | 10/2004 | Bauman | 455/7 |
| 2005/0018630 A1 | 1/2005 | Bianchi et al. | |
| 2005/0135286 A1 * | 6/2005 | Nurminen | H04W 84/18 |
| | | | 370/310 |
| 2005/0181812 A1 * | 8/2005 | Scheck | H04W 64/00 |
| | | | 455/507 |
| 2007/0036174 A1 | 2/2007 | Aris et al. | |
| 2007/0066234 A1 | 3/2007 | Lastinger et al. | |
| 2007/0178901 A1 * | 8/2007 | Williams | 455/439 |
| 2008/0063397 A1 | 3/2008 | Hu et al. | |
| 2008/0074289 A1 | 3/2008 | Sauder et al. | |
| 2008/0076424 A1 * | 3/2008 | Barber | H04W 8/08 |
| | | | 455/436 |
| 2008/0107014 A1 | 5/2008 | Huang et al. | |
| 2008/0134194 A1 | 6/2008 | Liu | |
| 2008/0139205 A1 * | 6/2008 | Sayeedi | H04W 12/06 |
| | | | 455/436 |
| 2008/0214221 A1 | 9/2008 | Kiyomoto et al. | |
| 2008/0232305 A1 | 9/2008 | Oren et al. | |
| 2008/0310526 A1 | 12/2008 | Maltsev et al. | |
| 2008/0310528 A1 | 12/2008 | Soong et al. | |
| 2009/0252139 A1 | 1/2009 | Ludovico et al. | |
| 2009/0059861 A1 * | 3/2009 | Gunnarsson | H04W 36/12 |
| | | | 370/331 |
| 2009/0061771 A1 * | 3/2009 | Ma | H04B 7/2606 |
| | | | 455/41.2 |
| 2009/0143065 A1 | 6/2009 | Mattila | |
| 2009/0180407 A1 | 7/2009 | Sabat et al. | |
| 2009/0180426 A1 | 7/2009 | Sabat et al. | |
| 2009/0196215 A1 | 8/2009 | Sabat et al. | |
| 2009/0232191 A1 * | 9/2009 | Gupta et al. | 375/216 |
| 2009/0252094 A1 * | 10/2009 | Chang | H04W 88/085 |
| | | | 370/329 |
| 2009/0252136 A1 | 10/2009 | Mahany et al. | |
| 2009/0268675 A1 | 10/2009 | Choi | |
| 2010/0002661 A1 | 1/2010 | Schmidt et al. | |
| 2010/0067906 A1 | 3/2010 | Adhikari et al. | |
| 2010/0093391 A1 | 4/2010 | Saban et al. | |
| 2010/0128676 A1 * | 5/2010 | Wu | H04L 45/308 |
| | | | 370/328 |
| 2010/0157901 A1 | 6/2010 | Sanderovitz et al. | |
| 2010/0177759 A1 | 7/2010 | Fischer et al. | |
| 2010/0178936 A1 | 7/2010 | Wala et al. | |
| 2010/0208777 A1 | 8/2010 | Ogaz | |
| 2010/0210232 A1 * | 8/2010 | Dominguez Romero | H04B 7/0877 |
| | | | 455/230 |
| 2010/0266287 A1 | 10/2010 | Adhikari et al. | |
| 2010/0278530 A1 | 11/2010 | Kummetz et al. | |
| 2010/0296816 A1 | 11/2010 | Larson | |
| 2011/0105184 A1 | 5/2011 | Piirainen et al. | |
| 2011/0122860 A1 * | 5/2011 | Guan | H04W 72/0453 |
| | | | 370/343 |
| 2011/0135308 A1 * | 6/2011 | Tarlazzi | H04B 7/0413 |
| | | | 398/79 |
| 2011/0149879 A1 | 6/2011 | Noriega et al. | |
| 2011/0158081 A1 | 6/2011 | Wang et al. | |
| 2011/0143649 A1 | 7/2011 | Sabat, Jr. et al. | |
| 2011/0171944 A1 * | 7/2011 | Kobayashi et al. | 455/418 |
| 2011/0201368 A1 | 8/2011 | Faccin et al. | |
| 2011/0222467 A1 | 9/2011 | Fujimura et al. | |
| 2011/0268446 A1 | 11/2011 | Cune et al. | |
| 2011/0269449 A1 * | 11/2011 | Kazmi | H04B 7/024 |
| | | | 455/422.1 |
| 2011/0287791 A1 * | 11/2011 | Fujishima | H04B 7/061 |
| | | | 455/500 |
| 2012/0027145 A1 | 2/2012 | Uyehara et al. | |
| 2012/0039254 A1 | 2/2012 | Stapleton et al. | |
| 2012/0057572 A1 | 3/2012 | Evans et al. | |
| 2012/0069880 A1 | 3/2012 | Lemson et al. | |
| 2012/0127938 A1 | 3/2012 | Lv et al. | |
| 2012/0099490 A1 * | 4/2012 | Kummetz et al. | 370/280 |
| 2012/0106657 A1 | 5/2012 | Fischer et al. | |
| 2012/0121240 A1 | 5/2012 | Ueda | |
| 2012/0121249 A1 | 5/2012 | Sabat et al. | |
| 2012/0177026 A1 | 7/2012 | Uyehara et al. | |
| 2012/0188985 A1 | 7/2012 | Miyamoto et al. | |
| 2012/0206885 A1 * | 8/2012 | Pan | H04M 1/0254 |
| | | | 361/737 |
| 2012/0208584 A1 * | 8/2012 | Liao | H04B 17/12 |
| | | | 455/509 |
| 2012/0236953 A1 * | 9/2012 | Mueck | 375/260 |
| 2012/0257575 A1 | 10/2012 | Davydov et al. | |
| 2012/0257659 A1 | 10/2012 | Braz et al. | |
| 2012/0314665 A1 | 12/2012 | Ishida et al. | |
| 2012/0314797 A1 | 12/2012 | Kummetz et al. | |

(56) References Cited

U.S. PATENT DOCUMENTS

| | | | |
|---|---|---|---|
| 2012/0314824 | A1 | 12/2012 | Fujimura |
| 2013/0017863 | A1* | 1/2013 | Kummetz et al. ......... 455/562.1 |
| 2013/0023285 | A1 | 1/2013 | Markhovsky et al. |
| 2013/0028218 | A1 | 1/2013 | Chun et al. |
| 2013/0089336 | A1 | 4/2013 | Dahlfort et al. |
| 2013/0095873 | A1 | 4/2013 | Soriaga et al. |
| 2013/0107763 | A1 | 5/2013 | Uyehara et al. |
| 2013/0114486 | A1 | 5/2013 | Spedaliere et al. |
| 2013/0114863 | A1 | 5/2013 | Kamata et al. |
| 2013/0121249 | A1 | 5/2013 | Ji et al. |
| 2013/0122830 | A1 | 5/2013 | Wang et al. |
| 2013/0128832 | A1 | 5/2013 | Kang et al. |
| 2013/0188753 | A1 | 7/2013 | Tarlazzi et al. |
| 2013/0272441 | A1 | 10/2013 | Uyehara et al. |
| 2013/0294253 | A1 | 11/2013 | Leroudier |
| 2014/0029431 | A1 | 1/2014 | Haberland et al. |
| 2014/0050483 | A1 | 2/2014 | Berlin et al. |
| 2014/0146906 | A1 | 5/2014 | Zavadsly et al. |
| 2014/0169263 | A1 | 6/2014 | Stapleton |
| 2014/0219140 | A1 | 8/2014 | Uyehara et al. |
| 2014/0226736 | A1 | 8/2014 | Niu et al. |
| 2014/0233548 | A1 | 8/2014 | Leizerovich et al. |
| 2014/0241258 | A1 | 8/2014 | Zack et al. |
| 2014/0241315 | A1 | 8/2014 | Niu et al. |
| 2014/0269966 | A1 | 9/2014 | Faccin et al. |
| 2014/0334305 | A1 | 11/2014 | Leroudier |
| 2014/0348068 | A1 | 11/2014 | Morper et al. |
| 2015/0256358 | A1 | 9/2015 | Stapleton et al. |
| 2015/0303950 | A1 | 10/2015 | Shattil |
| 2017/0250927 | A1 | 8/2017 | Stapleton et al. |
| 2018/0234875 | A1 | 8/2018 | Leroudier |
| 2019/0054908 | A1 | 2/2019 | Adachi et al. |
| 2019/0082407 | A1 | 3/2019 | Stapleton et al. |
| 2019/0215729 | A1 | 7/2019 | Oyman et al. |
| 2020/0186250 | A1 | 6/2020 | Stapleton et al. |
| 2020/0244316 | A1 | 7/2020 | Stapleton et al. |

FOREIGN PATENT DOCUMENTS

| | | |
|---|---|---|
| CN | 101621806 A | 1/2010 |
| CN | 103299557 A | 9/2013 |
| EP | 1047210 A2 | 10/2000 |
| EP | 1883167 A1 | 1/2008 |
| EP | 2512202 A1 | 10/2012 |
| EP | 2846475 A2 | 3/2015 |
| JP | 2007529926 | 10/2007 |
| JP | 2008-035521 A | 2/2008 |
| JP | 2010-128876 A | 6/2010 |
| JP | 2012015572 | 1/2012 |
| JP | 2017-087937 A | 5/2017 |
| KR | 10-2011-0117889 A | 10/2011 |
| KR | 10-1348424 B1 | 1/2014 |
| WO | WO 2006/134642 | 12/2006 |
| WO | 2008/076432 A1 | 6/2008 |
| WO | 2009/130199 A1 | 10/2009 |
| WO | WO 2011/039867 | 4/2011 |
| WO | WO 2012/139781 | 10/2012 |
| WO | 2013/009835 A1 | 1/2013 |
| WO | 2013/040589 A1 | 3/2013 |
| WO | WO 2013/048526 | 4/2013 |
| WO | WO 2013/070614 A1 | 5/2013 |
| WO | WO 2015/100315 | 7/2015 |
| WO | WO 2017/087937 | 5/2017 |

OTHER PUBLICATIONS

Extentended Euripean Serach Report for European Applicatioin No. 12847270.1, dated Jun. 29, 2015, 9 pages.
Office Action for Chinese Application No. 201280066105.6, dated Jul. 28, 2015, 10 pages.
Examiner's First Report for Australian Patent Application No. 2012336027, dated May 6, 2016, 4 pages.
Notice of Eligibility for Grant and Examination Report for Singapore Application No. 11201402105S, dated Jun. 7, 2016, 7 pages.
Second Office Action for Chinese Application No. 201280066105.6, dated Feb. 2, 2016, 3 pages.
CN201280066105.6 , "Office Action", dated Aug. 26, 2016, 3 pages.
JP2014-540195 , "Office Action", dated Aug. 2, 2016, 9 pages.
Examiner's Second Report for Australian Patent Application No. 2012336027, dated Sep. 29, 2016, 4 pages.
Liao et al., "Comparison of Downlink Power Allocation Mechanisms in Soft Handoff for the WCDMA System with Heterogeneous Cell Structures", Wireless Networks, Sep. 2005, vol. 11, pp. 593-605.
U.S. Appl. No. 61/374,593, filed Aug. 17, 2010, Lemson et al.
Florida Center for Instructional Technology College of Education, University of South Florida "An Educator's Guide to School Networks" Chapter 5: Topology; 1997.
Pato, Silvia et al. "On Building a Distributed Antenna System with Joint Signal Processing for Next-Generation Wireless Access Networks: The FUTON Approach" Published 2009.
International Preliminary Report on Patentability for International Application No. PCT/US2012/063721, dated May 22, 2014.
Examination and Search Report for UAE Application No. 471/2014, dated Oct. 31, 2018.
Notice of Acceptance for Patent Application for Australian Application No. 2012336027, dated Mar. 29, 2017.
Examination Report for Australian Application No. 2017204786, dated Jul. 18, 2018.
Notice of Acceptance for Patent Application for Australian Application No. 2017204786, dated Jul. 15, 2019.
Examination Report for Australian Application No. 2019253897, dated Aug. 31, 2020.
Office Action (Including Translation) for Brazilian Application No. 1120140108951, dated Apr. 9, 2020.
Notification to Grant Patent Right (Including Translation) for Chinese Application No. 201280066105.6, dated May 11, 2017.
First Office Action (Including Translation) for Chinese Patent Application No. 201710619658.4, dated Aug. 28, 2020.
Office Action (Including Translation) for Eurasian Application No. 201400556 dated Apr. 13, 2017.
Office Action (Including Translation) for Eurasian Application No. 201400556 dated Apr. 17, 2018.
Office Action (Including Translation) for Eurasian Application No. 201400556 dated May 27, 2020.
Notice of Allowance for Eurasian Application No. 201400556 dated Aug. 12, 2020.
Examiner's interview Summary for European Application No. 12847270.1, dated Jun. 26, 2017.
Intention to Grant for European Application No. 12847270.1, dated Jul. 4, 2017.
Intention to Grant for European Application No. 12847270.1, dated Nov. 27, 2017.
European Search Report for European Application No. 18178591.6, dated Nov. 7, 2018.
Intention to Grant for European Application No. 18178591.6, dated Oct. 9, 2019.
European Search Report for European Application No. 20163665.1, dated May 28, 2020.
Substantive Examination Report Stage 1 (Including Translation) for Indonesia Application No. P00201403239, dated Mar. 20, 2019.
Notice of Allowance (Including Translation) for Indonesia Application No. P00201403239, dated Oct. 31, 2019.
Office Action (Including Translation) for Israel Patent Application No. 232439, dated Aug. 14, 2017.
Notice of Allowance for Israel Patent Application No. 232439, dated Nov. 21, 2019.
Examination Report for Indian Patent Application No. 4237/CHENP/2014, dated Nov. 14, 2018.
Decision to Grant (Including Translation) for Japanese Patent Application No. 2014-540195, dated Jan. 27, 2017.
First Office Action (Including Translation) for Korean Application No. 10-2014-7015429, dated Oct. 15, 2018.
First Office Action (Including Translation) for Korean Application No. 10-2014-7015429, dated Aug. 29, 2019.

(56) References Cited

OTHER PUBLICATIONS

First Office Action (Including Translation) for Korean Application No. 10-2019-7035245, dated Jan. 6, 2020.
Notice of Allowance (Including Translation) for Korean Application No. 10-2019-7035245, dated Jul. 27, 2020.
International Search Report for International Application No. PCT/US2014/072132, dated Apr. 1, 2015.
Written Opinion for International Application No. PCT/US2014/072132, dated Apr. 1, 2015.
International Preliminary Report on Patentability for International Application No. PCT/US2014/072132, dated Jul. 7, 2016.
Examination Report for Australian Patent Application No. 2014369919, dated Mar. 27, 2018.
Examination Report for Australian Patent Application No. 2014369919, dated Aug. 21, 2018.
Examination Report for Australian Patent Application No. 2019202115, dated Feb. 18, 2020.
Notice of Acceptance for Australian Patent Application No. 2019202115, dated Apr. 21, 2020.
Official Action (Including Translation) for Brazilian Application No. 11 2016 014663 8, dated Jul. 3, 2020.
First Office Action for Chinese Patent Application No. 201480070750.4, dated Feb. 2, 2019.
Second Office Action (Including Translation) for Chinese Patent Application No. 201480070750.4, dated Sep. 17, 2019.
European Search Report for European Application No. 14874737.1, dated Jul. 11, 2017.
Office Action (Including Translation) for Indonesian Application No. P00201604818, dated Jul. 19, 2019.
Office Action (Including Translation) for Israel Patent Application No. 246242, dated Nov. 5, 2018.
First Examination Report for Indian Application No. 201617024316, dated Feb. 24, 2020.
Notice of Reasons for Rejection (Including Translation) for Japanese Patent Application No. 2016-560881, dated Oct. 29, 2018.
Final Decision of Rejection for Rejection (Including Translation) for Japanese Patent Application No. 2016-560881, dated Jul. 1, 2019.
Notice of Reasons for Rejection (Including Translation) for Japanese Patent Application No. 2019-197499, dated Sep. 8, 2020.
International Search Report for International Application No. PCT/US2016/063039, dated Feb. 1, 2017.
Written Opinion for International Application No. PCT/US2016/063039, dated Feb. 1, 2017.
International Preliminary Report on Patentability for International Application No. PCT/US2016/063039, dated May 31, 2018.
Examination Report for Australian Application No. 2016357315, dated Apr. 8, 2020.
European Search Report for European Patent Application No. 16867324.2, dated May 14, 2019.
Office Action for European Patent Application No. 16867324.2, dated Jan. 29, 2020.
Office Action for U.S. Appl. No. 14/580,585, dated Oct. 8, 2015.
Office Action for U.S. Appl. No. 14/580,585, dated Apr. 21, 2016.
Office Action for U.S. Appl. No. 14/580,585, dated Apr. 12, 2017.
Office Action for U.S. Appl. No. 14/580,585, dated Dec. 28, 2017.
Office Action for U.S. Appl. No. 14/580,585, dated May 31, 2019.
Notice of Allowance for U.S. Appl. No. 14/580,585, dated Jan. 8, 2020.
Office Action for U.S. Appl. No. 16/849,087, dated Aug. 6, 2020.
Office Action for U.S. Appl. No. 15/358,060, dated Apr. 11, 2018.
Office Action for U.S. Appl. No. 15/358,060, dated Jan. 10, 2019.
Office Action for U.S. Appl. No. 16/734,833, dated Jun. 25, 2020.
Notice of Allowance (Including Translation) for Indonesian Application No. P00201604818, dated Nov. 20, 2020.
Office Action (Including Translation) for Korean Application No. 10-2016-7020070, dated Nov. 10, 2020.
Office Action for European Patent Application No. 16867324.2, dated Oct. 13, 2020.
Eurasian Search Report for application No. 202092199 dated Feb. 9, 2021 (English Translation not available).
Office Action for Eurasian Application No. 201400556, dated Dec. 11, 2015, 4 pages.
Second Written Opinion of the Intellectual Property Office of Singapore for corresponding Singapore Application No. 11201402105S, dated Oct. 30, 2015, 10 pages.
First Written Opinion of the Intellectual Property Office of Singapore for corresponding Singapore Application No. 11201402105S, dated Mar. 26, 2015, 10 pages.
CN201 7106196584 Supplemental Search Report dated Aug. 3, 2021, 1 page.

* cited by examiner

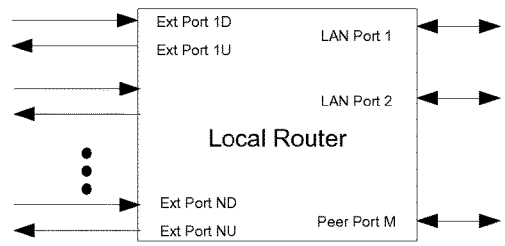
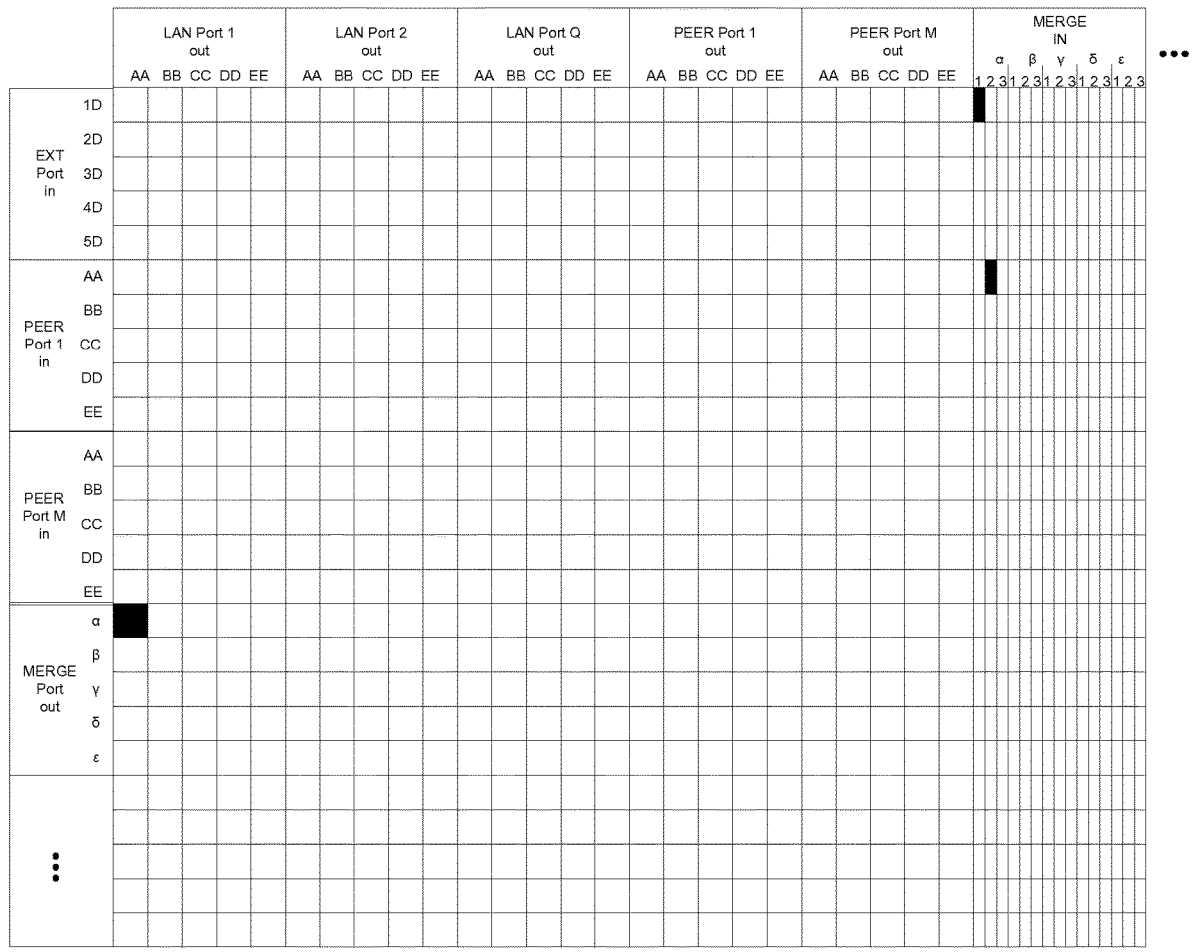
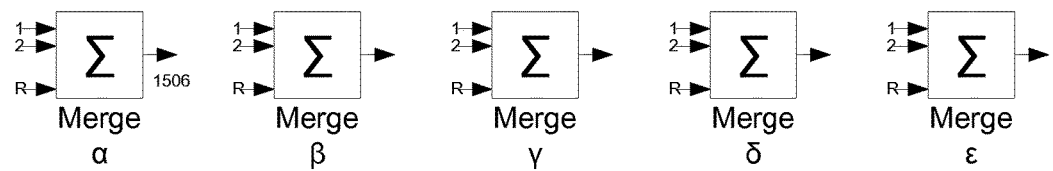
FIG. 16

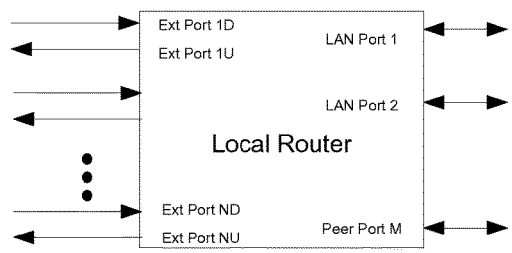
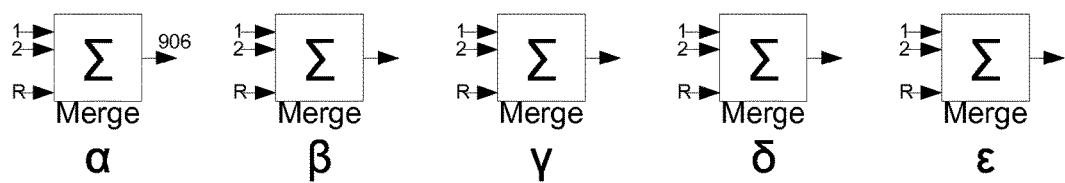
FIG. 17

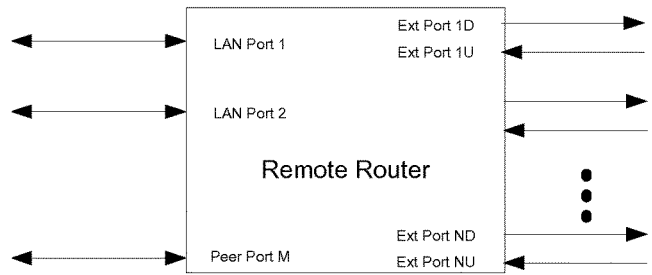
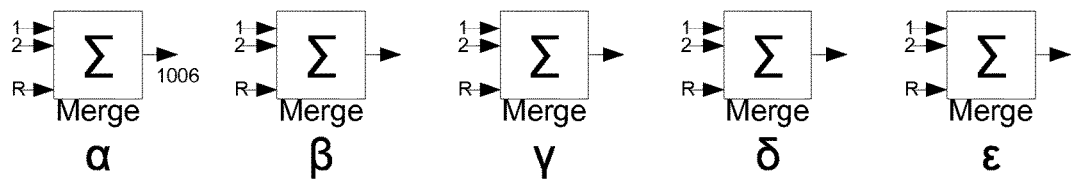
FIG. 18

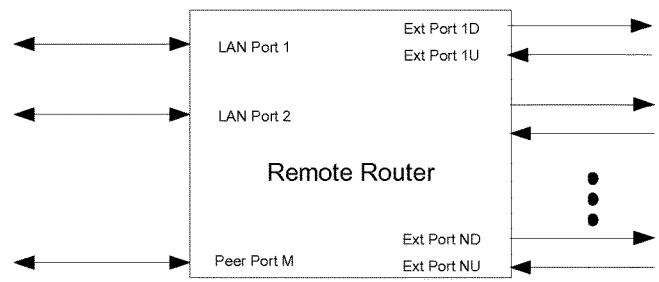
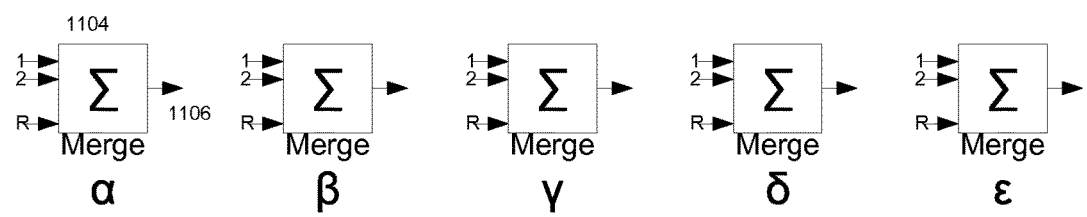
FIG. 19

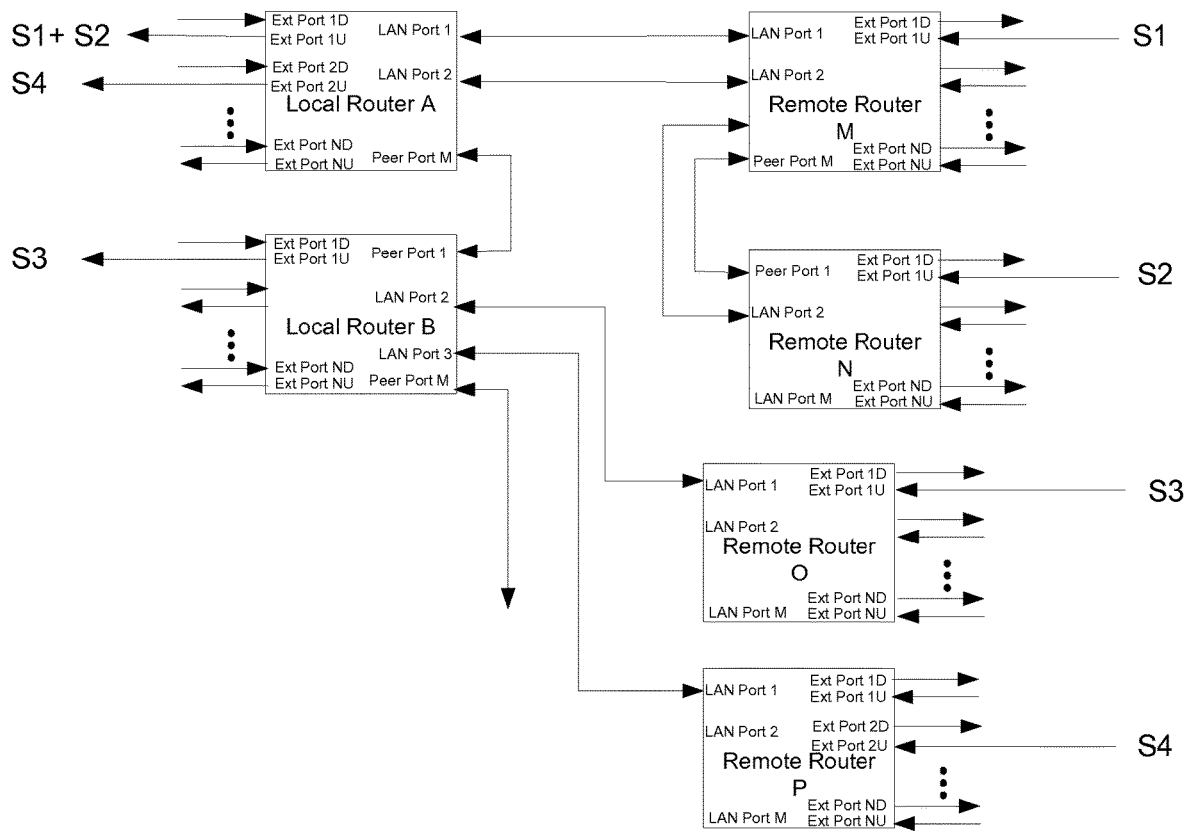

S3@ Remote Router O Physical Node 1 → S3@ Local Router B Physical Node 1

|  | IN | OUT |
| --- | --- | --- |
| Router O | External Port 1U | LAN Port 1, Stream AA |
| Router B | LAN Port 2, Stream AA | External Port 1U |

S4@ Remote Router P Physical Node 2 → S4@ Local Router A Physical Node 2

|  | IN | OUT |
| --- | --- | --- |
| Router P | External Port 2U | LAN Port 1, Stream BB |
| Router B | LAN Port 3, Stream BB | PEER Port 1, Stream BB |
| Router A | PEER Port M, Stream BB | External Port 2U |

S1@ Remote Router M Physical Node 1 + S2@ Remote Router N Physical Node 1 → S1+S3@ Local Router A Physical Node 1

|  | IN | OUT |
| --- | --- | --- |
| Router N | External Port 1U | PEER Port 1, Stream AA |
| Router M | PEER Port M, Stream AA | MERGE α IN 1 |
| Router M | External Port 1U | MERGE α IN 2 |
| Router M | MERGE α OUT | LAN Port 1, Stream AA |
| Router A | LAN Port 1, Stream AA | External Port 1U |

FIG. 21

SOFT HAND-OFF AND ROUTING DATA IN A VIRTUALIZED DISTRIBUTED ANTENNA SYSTEM

CROSS-REFERENCE TO RELATED APPLICATIONS

This application is a non-provisional of and claims the benefit of and priority to U.S. Application No. 61/556,685, filed on Nov. 7, 2011 and U.S. Application No. 61/556,689, filed on Nov. 7, 2011. Each of these applications is hereby incorporated by reference in its entirety for all purposes.

BACKGROUND

A communication network is a means for conveying information from one place to another. The information can be digital data, audio, video, text, graphics, data, sign language, or other forms. Establishing and maintaining communication networks is one of the oldest known activities of mankind, ranging from the shouting and drum signals of prehistory through written messages, signal flags, signal fires, smoke signals, signal mirrors, heliographs, signal lanterns, telegraphs, radios, telephones, televisions, microwave signals, linked computers and the internet. Despite the advancements in communication networks, clients continue to seek new advancements in services that provide communication capabilities more reliably than current services.

SUMMARY

Embodiments of the present invention relate to communication networks. More particularly, embodiments of the present invention provide methods and systems related to the provision and operation of virtual distributed antenna systems. Merely by way of example, the present invention has been applied to distributed antenna systems. The methods and systems described herein are applicable to a variety of communications systems including systems utilizing various communications standards.

Some embodiments of the present invention relate to a dynamic allocation of network resources, such that resource allocation can be modified, despite a fixed physical architecture. This objective may be accomplished, for example, by using a plurality of software-defined radio (SDR) (which may also be referred to as a software-configurable radio (SCR)) based Distributed Antenna Systems (DASs). Each DAS may receive resources (e.g., RF carriers, Long Term Evolution Resource Blocks, Code Division Multiple Access codes or Time Division Multiple Access time slots) from a central base station including a plurality of sectors and distribute the resources to a plurality of digital remote units (DRUs). Each DRU can serve as an antenna, receiving and transmitting signals, and thereby providing network coverage to a local geographic area surrounding the physical DRU. The DAS may be physically coupled to the base station and to the plurality of DRUs, e.g., through an optical fiber link. Thus, resources provided by one base station may be distributed to a plurality of DRUs, thereby providing coverage over a larger geographical area.

A DAS may be coupled (e.g., through another optical fiber link) to one or more other DASs. Therefore, the DAS may also: (1) allocate part of the resources associated with another base station (which may be referred to as a sector) to the DRUs physically coupled to the DAS; and/or (2) allocate resources from the sector physically coupled to the DAS to serve DRUs physically coupled to another DAS. This may allow a system to dynamically allocate resources from a plurality of sectors to a network of DRUs (e.g., responding to geographic and temporal patterns in device usage), thereby improving the efficiency of the system and meeting desired capacity and throughput objectives and/or wireless subscriber needs.

In some embodiments of the invention, a system for managing resource use in a Distributed Antenna System is provided. The system may include: a plurality of Digital Remote Units (DRUs) configured to send and receive wireless radio signals; a plurality of sectors, each configured to send and receive wireless radio signals; and a plurality of inter-connected Digital Access Units (DAUs), each configured to communicate with at least one of the DRUs via optical signals, and each being coupled to at least one of the sectors.

The system may further include an algorithm (e.g., a nonlinear algorithm) for determining the power of a signal from one of the plurality of DRUs to one of the plurality of sectors and the power of the same signal from the same one of the plurality of DRUs to another of the plurality of sectors. The at least two of the sectors may be associated with different carriers, and the power of each carrier supplied to each DRU of the plurality of DRUs is independently controlled. The DRUs may be connected in a loop to a plurality of DAUs. A single DAU port may be coupled to a plurality of the sectors. The system may further include a server configured to route signals between the plurality of DAUs. The plurality of sectors may include multiple sectors from one Base Transceiver Station. Each of the plurality of DAUs may be configured to communicate with the at least one of the DRUs by sending and receiving signals over at least one of an optical fiber, an Ethernet cable, microwave line of sight link, wireless link, or satellite link. Each of the plurality of DAUs may be further configured to convert a radio signal received from the at least one sector to an optical signal. Each of the DAUs may be co-located with the at least one sector. Each of the plurality of DAUs may be connected to a plurality of DRUs. At least some of the DRUs may be connected in a daisy chain configuration. The DRUs may be connected to the DAUs in a star configuration. The system may further include a dynamic database comprising sector assignments for each of the plurality of DRUs, wherein the database is accessible by the plurality of DAUs.

In some embodiments of the invention, a method for managing resource use in a Distributed Antenna System is provided. The method may include: assigning a Digital Remote Units (DRU) to a first of a plurality of sectors; receiving a first optical signal at a first Digital Access Unit (DAU) from a DRU; converting the first optical signal to a first radio signal; transmitting the first radio signal to the first sector; re-assigning the DRU to a second of the plurality of sectors, the second sector being different from the first sector; receiving a second optical signal at the first DAU from the DRU; transmitting the second optical signal from the first DAU to a second DAU; converting the second optical signal to a second radio signal; and transmitting the second radio signal to the second sector. The re-assignment may be based at least partly on an actual or predicted increase use of a wireless network at a portion of the network's coverage. The method may further include: storing the assignment in a database; and updating the database to include the re-assignment. In some instances, a hardware architecture of the Distributed Antenna System is not modified between the assignment and the re-assignment.

In some embodiments of the invention, a method for managing resource use in a Distributed Antenna System is provided. The method may include: receiving a radio signal; decoding at least part of the signal; identifying a source Digital Remote Unit (DRU) amongst a plurality of DRUs based on the decoded signal; converting the signal into a digital signal; determining a subset of recipient sectors from a plurality of sectors based on the identified source DRU; and transmitting the digital signal to the subset of recipient sectors. Transmitting the digital signal to the subset of recipient sectors may be performed by a first digital access unit (DAU) and comprises transmitting the digital signal to a second DAU. The subset of sectors may consist of and/or include one sector. The subset of recipient may be determined at least partly by using a dynamic DRU-sector assignment database at least partly based on dynamic geographic discrepancies in network use.

In some embodiments of the invention, a non-transitory computer-readable storage medium is provided. The medium may include a plurality of computer-readable instructions tangibly embodied on the computer-readable storage medium, which, when executed by one or more data processors, provide routing of wireless network signals. The plurality of instructions may include: instructions that cause the data processor to decode a digital signal; instructions that cause the data processor to identify a Digital Remote Unit (DRU) based on the decoded signal; instructions that cause the data processor to convert the digital signal into a radio-frequency signal; instructions that cause the data processor to dynamically determine an assignment pairing the DRU with one or more Base Transceiver Station sectors, the assignment being at least partly determined by dynamic geographic discrepancies in network use; and instructions that cause the data processor to transmit the digital signal to the one or more assigned sectors.

According to an embodiment of the present invention, a system for routing signals in a Distributed Antenna System is provided. The system includes a plurality of Digital Access Units (DAUs). The plurality of DAUs are coupled and operable to route signals between the plurality of DAUs. The system also includes a plurality of Digital Remote Units (DRUs) coupled to the plurality of DAUs and operable to transport signals between DRUs and DAUs. The system further includes a plurality of Base Transceiver Stations (BTS), a plurality of Base Transceiver Station sector RF connections coupled to the plurality of DAUs and operable to route signals between the plurality of DAUs and the plurality of Base Transceiver Stations sector RF port connections, and one or more routing tables.

According to another embodiment of the present invention, a method for routing signals in a Distributed Antenna System including a plurality of Digital Access Units (DAUs), a plurality of Digital Remote Units (DRUs), a plurality of Base Transceiver Stations (BTS), and a plurality of Base Transceiver Station sector RF connections is provided. The method includes transporting signals between the DRUs and the DAUs and routing the signals between DAUs using one or more peer ports of the DAUs. The method also includes routing the signals between DAUs and the plurality of BTS sector RF port connections.

Numerous benefits are achieved by way of the present invention over conventional techniques. For instance, embodiments of the present invention allow a network to effectively respond to a geographically mobile user base. For example, if users concentrate in a cafeteria over lunch hours, but not during other times of the day, some resources may be allocated to serve this area only for time periods when the users actually are or are predicted to be at this location. Thus, a network operator need not either waste resources to provide coverage in the cafeteria during the evening, nor must it frustrate users by failing to provide sufficient coverage in the cafeteria during lunch hours. Rather, resources may be flexibly managed and controlled, thereby improving a network's efficiency, usage and overall performance. Further, due to this foreseeable efficiency, network operators may be able to increase physical distances between transceivers, as additional resources may be provided to any given transceiver when needed. Therefore, a total geographical coverage area may be increased. Additionally, specialized applications and enhancements may be enabled, such as flexible simulcast, automatic traffic load-balancing, network and radio resource optimization, network calibration, autonomous/assisted commissioning, carrier pooling, automatic frequency selection, radio frequency carrier placement, traffic monitoring, traffic tagging, and the like. Embodiments may also be implemented to serve multiple operators, multi-mode radios (modulation-independent) and multiple frequency bands per operator to increase the efficiency and traffic capacity of the operators' wireless networks.

These and other embodiments of the invention along with many of its advantages and features are described in more detail in conjunction with the text below and attached figures.

BRIEF DESCRIPTION OF THE DRAWINGS

FIG. 16 shows an embodiment of the Local Router table for the downlink signals according to an embodiment of the present invention;

FIG. 17 shows an embodiment of the Local Router table for the Uplink signals according to an embodiment of the present invention;

FIG. 18 shows an embodiment of the Remote Router table for the downlink signals according to an embodiment of the present invention;

FIG. 19 shows an embodiment of the Remote Router table for the uplink signals according to an embodiment of the present invention;

FIG. 21 shows 3 examples of routing Uplink signals over the network of DAUs and DRUs according to an embodiment of the present invention.

DETAILED DESCRIPTION

Figure 1:
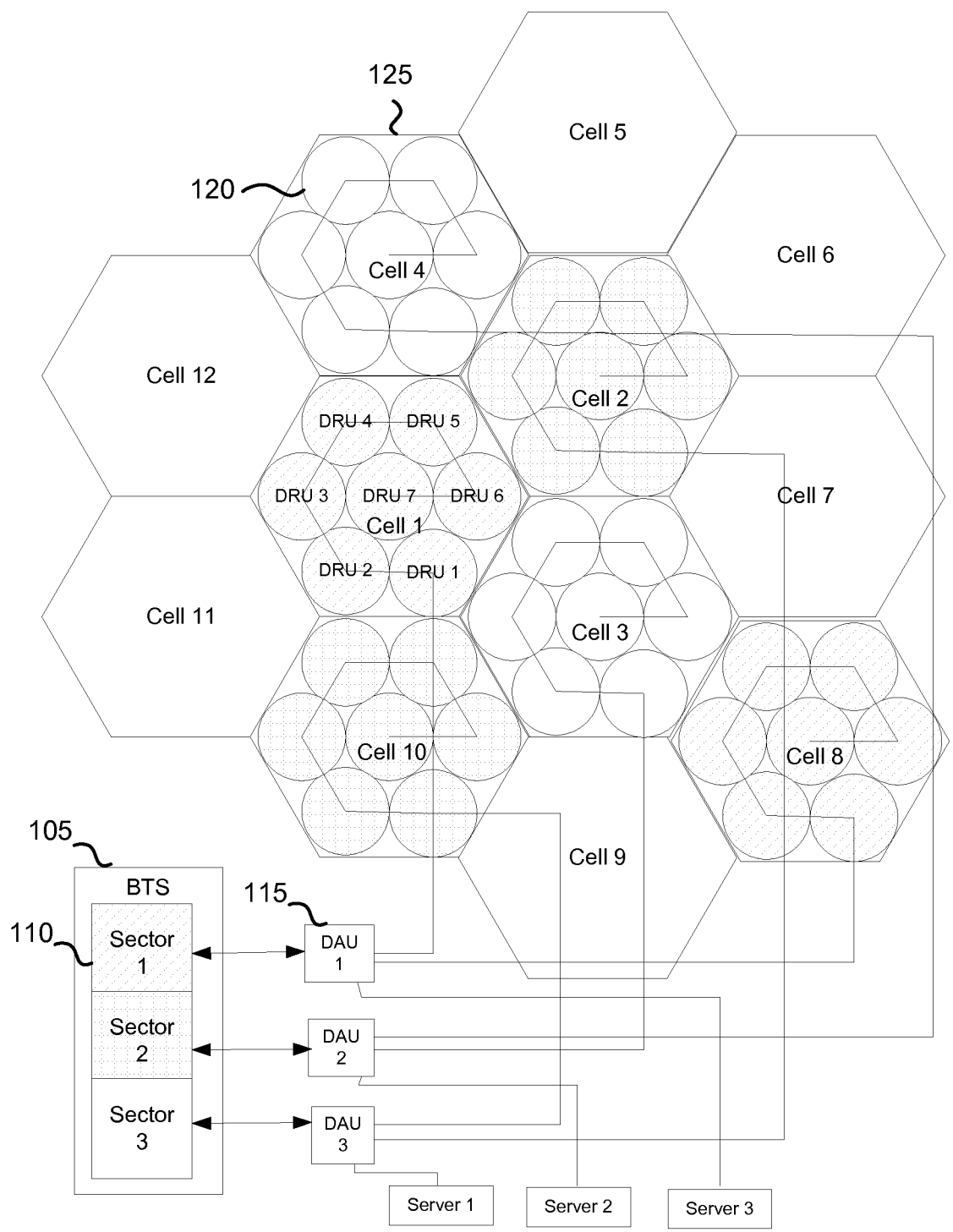
FIG. 1 is a high level schematic diagram illustrating a wireless network system providing coverage to a geographical area according to an embodiment of the present invention.

Wireless and mobile network operators face the continuing challenge of building networks that effectively manage high data-traffic growth rates. To ensure customer satisfaction, network operators attempt to provide networks that are available and functional in most locations where their clients will expect to be able to use their devices. This is a difficult task, as it is hard to determine how to geographically allocate resources, given the unpredictable nature of where and how users will wish to use their devices.

Allocating network resources is complicated by users' mobility and unpredictability. For example, configuring a network to effectively allocate wireless network resources in an office building may present challenges (e.g., with regard to available wireless capacity and data throughput) if workers migrate from their offices to congregate in a cafeteria during lunch hours. Efficient resource allocation for work hours may provide poor coverage to users during lunch hours. To accommodate variations in wireless subscriber loading at wireless network antenna locations at various times of day and for different days of the week, there are several candidate conventional approaches.

One approach is to deploy many low-power high-capacity base stations throughout the facility. The quantity of base stations is determined based on the coverage of each base station and the total space to be covered. Each of these base stations is provisioned with enough radio resources, i.e., capacity and broadband data throughput to accommodate the maximum subscriber loading which occurs during the course of the workday and work week. Although this approach typically yields a high quality of service for wireless subscribers, the notable disadvantage of this approach is that many of the base stations' capacity is being wasted for a large part of the time. Since a typical indoor wireless network deployment involves capital and operational costs which are assessed on a per-subscriber basis for each base station, the typically high total life cycle cost for a given enterprise facility is far from optimal.

A second candidate approach involves deployment of a distributed antenna system (DAS) along with a centralized group of base stations dedicated to the DAS. A conventional DAS deployment falls into one of two categories. The first type of DAS is "fixed", where the system configuration doesn't change based on time of day or other information about usage. The remote units associated with the DAS are set up during the design process so that a particular block of base station radio resources is thought to be enough to serve each small group of DAS remote units. A notable disadvantage of this approach is that most enterprises seem to undergo frequent re-arrangements and re-organizations of various staff groups within the enterprise. Therefore, it's highly likely that the initial DAS setup will need to be changed from time to time, requiring deployment of additional direct staff and contract resources with appropriate levels of expertise regarding wireless networks.

The second type of DAS is equipped with a type of network switch which allows the location and quantity of DAS remote units associated with any particular centralized base station to be changed manually. Although this approach would appear to support dynamic DAS reconfiguration based on the needs of the enterprise or based on time of day, it frequently implies that additional staff resources would need to be assigned to provide real-time management of the network. Another issue is that it's not always correct or best to make the same DAS remote unit configuration changes back and forth on each day of the week at the same times of day. Frequently it is difficult or impractical for an enterprise IT manager to monitor the subscriber loading on each base station. And it is almost certain that the enterprise IT manager has no practical way to determine the loading at a given time of day for each DAS remote unit; they can only guess the percentage loading.

Another major limitation of conventional DAS deployments is related to their installation, commissioning and optimization process. Some challenging issues which must be overcome include selecting remote unit antenna locations to ensure proper coverage while minimizing downlink interference from outdoor macro cell sites, minimizing uplink interference to outdoor macro cell sites, and ensuring proper intra-system handovers while indoors and while moving from outdoors to indoors (and vice-versa). The process of performing such deployment optimization is frequently characterized as trial-and-error. Therefore, the results may not be consistent with a high quality of service.

Based on the conventional approaches described herein, it is apparent that a highly efficient, easily deployed and dynamically reconfigurable wireless network is not achievable with conventional systems and capabilities. Embodiments of the present invention substantially overcome the limitations of the conventional approach discussed above. The advanced system architecture provided by embodiments of the present invention provides a high degree of flexibility to manage, control, enhance and facilitate radio resource efficiency, usage and overall performance of the distributed wireless network. This advanced system architecture enables specialized applications and enhancements including, but not limited to, flexible simulcast, automatic traffic load-balancing, network and radio resource optimization, network calibration, autonomous/assisted commissioning, carrier pooling, automatic frequency selection, radio frequency carrier placement, traffic monitoring, and/or traffic tagging. Embodiments of the present invention can also serve multiple operators, multi-mode radios (modulation-independent) and multiple frequency bands per operator to increase the efficiency and traffic capacity of the operators' wireless networks.

Accordingly, embodiments of the provide a capability for Flexible Simulcast. With Flexible Simulcast, the amount of radio resources (such as RF carriers, LTE Resource Blocks, CDMA codes or TDMA time slots) assigned to a particular DRU or group of DRUs can be set via software control to meet desired capacity and throughput objectives or wireless subscriber needs. Applications of the present invention are suitable to be employed with distributed base stations, distributed antenna systems, distributed repeaters, mobile equipment and wireless terminals, portable wireless devices, and other wireless communication systems such as microwave and satellite communications.

FIG. 1 is a diagram illustrating one wireless network system 100 that may provide coverage to a geographical area according to an embodiment of the present invention. System 100 may include a distributed antenna system (DAS), which may efficiently use base-station resources. One or more base stations 105 may be located in a central location and/or at a base station hotel. One or more base stations 105 may include a plurality of independent outputs or radio resources, known as sectors 110. Each sector 110 may be responsible for providing wireless resources (e.g., RF carrier signals, Long Term Evolution Resource Blocks, Code Division Multiple Access codes, Time Division Multiple Access time slots, etc.). The resources may include one or more resources that allow a wireless user mobile device to effectively and wirelessly send and receive communications over a network. Thus, the resources may include one or more resources, such as those listed above, that allow a signal to be encoded or decoded in a manner to prevent the signal from interfering with or being interfered with by other wireless signals. Different sectors may be used to cover 3 separate geographical areas without creating co-channel interference between users in the distinct sectors.

Each sector may be coupled to a software-defined radio (SDR) (which may also be referred to as a software-configurable radio (SCR)) based digital access unit (DAU) 115, which may interface sector 110 (and thus base station 105) with digital remote units (DRUs) 120. The coupling may represent a physical coupling. For example, DAU 115 may be connected to sector 110 and/or DRU 120 via a cable, a link, fiber, an RF cable, an optical fiber, an Ethernet cable, microwave line of sight link, wireless link, satellite link, etc. In some instances, DAU 115 is connected to sector 110 via an RF cable. In some instances, DAU 115 is connected to one or more DRUs via an optical fiber or Ethernet cable. An associated sector 110 and DAU 115 may be located near each other or at a same location. DAU 115 may convert one or more signals, such as optical signals, RF signals, digital signals, etc. DAU 115 may include a multi-directional signal converter, such that, e.g., RF signals may be converted to optical signals and optical signals to RF signals, or to convert signals between a signal type associated with a sector and a signal type associated with a DRU. In one embodiment, DAU 115 converts a sector's downlink RF signals to optical signals, and/or converts a DRU's uplink optical signals to RF signals. DAU 115 may also or alternatively control routing of data and/or signals between sectors and DRUs, as explained in greater detail below. DAU 115 may generate and/or store traffic statistics, such as a number of communications, calls, network-access sessions, etc. between sector 110 and one or more DRUs 120.

Each DAU 115 may be coupled to a plurality of digital remote units (DRUs) 120. The plurality of DRUs 120 may be coupled to the 115 through, e.g., a daisy-chain (indirectly coupling a DAU with one or more DRUs) and/or star configuration (directly coupling a DAU to multiple DRUs). FIG. 1 shows an example of daisy-chain configurations, wherein a DAU couples to a first DRU directly (e.g., direct connection from DAU 1 to DRU 1), a second DRU indirectly (e.g., indirect connection from DAU 1 to DRU 2 through DRU 1), a third DRU indirectly (e.g., indirect connection from DAU 1 to DRU 3 through DRUs 1 and 2), etc. FIG. 1 also shows an example of star configurations, wherein a DAU couples to multiple DRUs directly (e.g., direct connections from DAU 1 to DRU 1 and DRU 23). Each DRU can provide unique header information associated with each DRU which uniquely identifies uplink data received by that particular DRU.

Each of the DRUs can provide coverage within a geographical area physically surrounding the DRU. DRUs 120 may be strategically located to efficiently provide combined coverage across a larger geographical area (a "cell" 125). For example, DRUs 120 may be located along a grid, and/or coverage areas associated with adjacent DRUs 120 may be barely overlapping. A network may include a plurality of independent cells that span a total coverage area.

Each cell 125 may be assigned to a sector 110. FIG. 1, for example, shows an embodiment in which Sector 1 provides resources to Cells 1 and 8, Sector 2 to Cells 2 and 10, and Sector 3 to Cells 3 and 4. An associated sector may provide each DRU with resources, such as RF carriers, resource blocks, etc. In one embodiment, each of a plurality of sectors 110 is associated with a set of "channels" or frequency ranges. The set of channels associated with each sector 110 may be different from a set of channels associated with other sectors 110 in base station 105. A network may be configured such that neighboring cells 125 are associated with different channels (e.g., by being associated with different sectors 110), as shown in FIG. 1. This may allow channels to be reused across multiple cells without the risk of creating interference.

Figure 2:
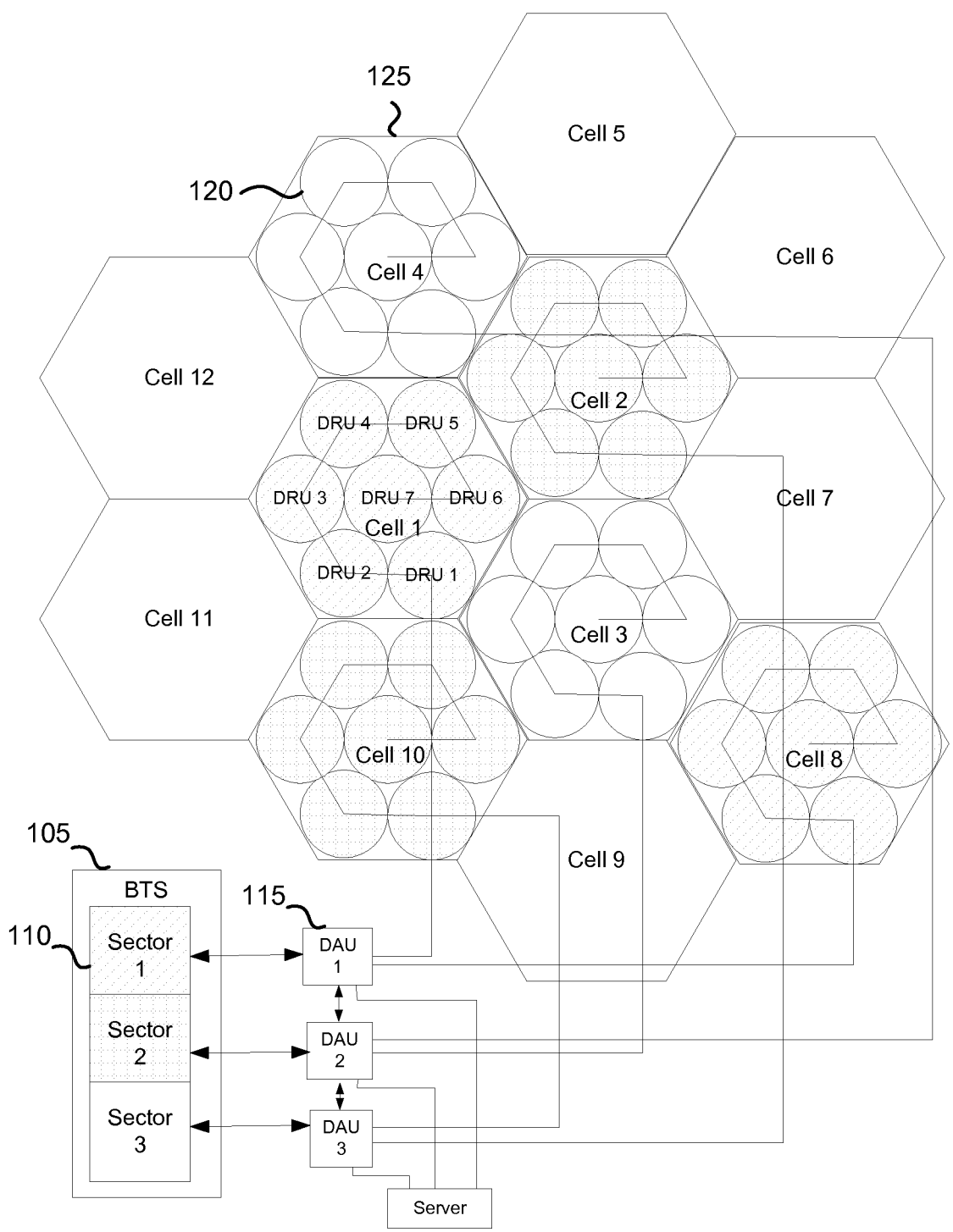
FIG. 2 is a high level schematic diagram illustrating a wireless network system comprising interconnected DAUs, the network providing coverage to a geographical area according to an embodiment of the present invention.
Figure 3:
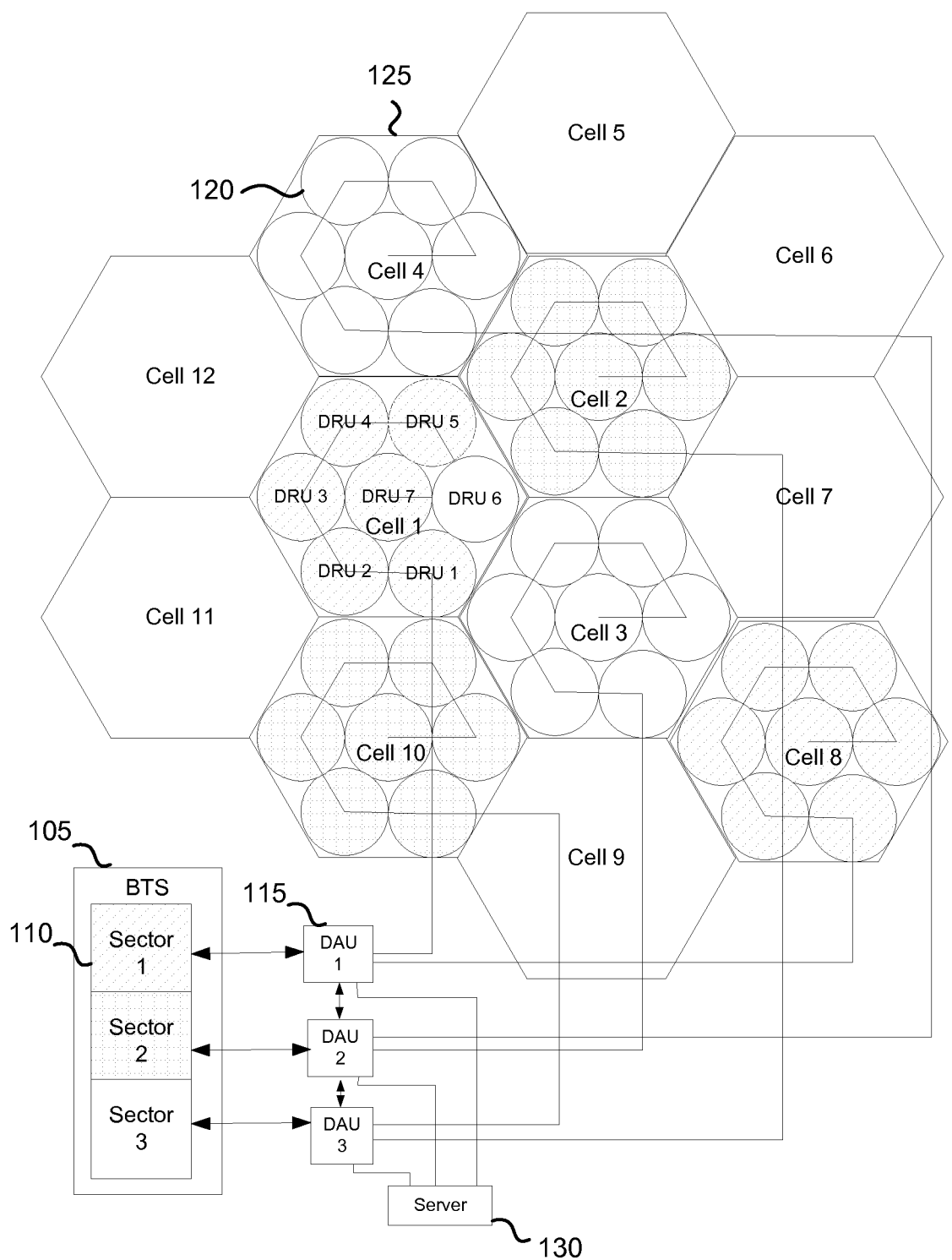
FIG. 3 is a high level schematic diagram illustrating a wireless network system comprising interconnected DAUs, the network providing coverage to a geographical area according to another embodiment of the present invention.

In the embodiment shown in FIG. 1, each sector 110 is connected to an associated subset of all of the DRUs in the network. Thus, for example, Sector 1's resources (e.g., assigned channels) cannot be used by a DRU located in Cell 8 without a physical alteration to the network hardware (e.g., by re-routing an optical fiber). This limitation is avoided by the embodiment shown in FIG. 2. Specifically, DRUs 120 may be dynamically assigned to sectors 110 based on an interconnection between DAUs 115 (e.g., interconnected using PEER ports). Thus, for example, DRUs 1-7 in Cell 1 may initially all be assigned to Sector 1. (FIG. 2.) Subsequently, DRU 5 may be assigned to Sector 3 and DRU 6 may be assigned to Sector 4. (FIG. 3.) In such instances, signals to DRU 6 may pass from Sector 2 through DAU 2 and through DAU 1. (Conversely, signals may pass from DRU 6 through DAU 1 and DAU 2 to Sector 2.) Similarly, signals to DRU 5 may pass from Sector 3 through DAU 3, through DAU 2 and through DAU 1. In this manner, a sector may be indirectly connected with a larger subset of DRUs in a network or with all DRUs in a network. Communications between DAUs may be partly controlled by one or more servers 130, as explained in greater detail below.

DAUs 115 may be physically and/or virtually connected. For example, in one embodiment, DAUs 115 are connected via a cable or fiber (e.g., an optical fiber, an Ethernet cable, microwave line of sight link, wireless link, or satellite link). In one embodiment, a plurality of DAUs 115 are connected to a wireless network, which allows information to be transmitted from one DAU 115 to another DAU 115 and/or allows information to be transmitted from/to a plurality of DAUs 115.

In some embodiments, DRUs 120 can be interconnected in a manner to facility revisions in resource routing. For example, a DRU 120 connected to a DAU 115 or sector 110 can be connected two other DRUs 120—one within a daisy-chain and another connected to another daisy-chain. Thus, a set of interconnected "mesh" DRUs 120 (rather than or in addition to the DAUs) can route signals between other DRUs (e.g., in different daisy-chains).

One feature of embodiments of the present invention is the ability to route Base Station radio resources among the DRUs or group(s) of DRUs. In order to route radio resources available from one or more Base Stations, it is desirable to configure the individual router tables of the DAUs and DRUs in the DAS network. This functionality is provided by embodiments of the present invention.

In some embodiments of the present invention, router tables are used to configure the networked DAUs. The local router tables establish the mapping of the inputs to the various outputs. Internal Merge blocks are utilized for the Downlink Tables when the inputs from an External Port and a PEER Port need to merge into the same data stream. Similarly, Merge blocks are used in the Uplink Tables when the inputs from the LAN Ports and PEER Ports need to merge into the same data stream.

The remote router tables establish the mapping of the inputs to the various outputs. Internal Merge blocks are utilized for the Downlink Tables when the inputs from a LAN Port and a PEER Port need to merge into the same data stream. Similarly, Merge blocks are used in the Uplink Tables when the inputs from the External Ports and PEER Ports need to merge into the same data stream.

Figure 4:
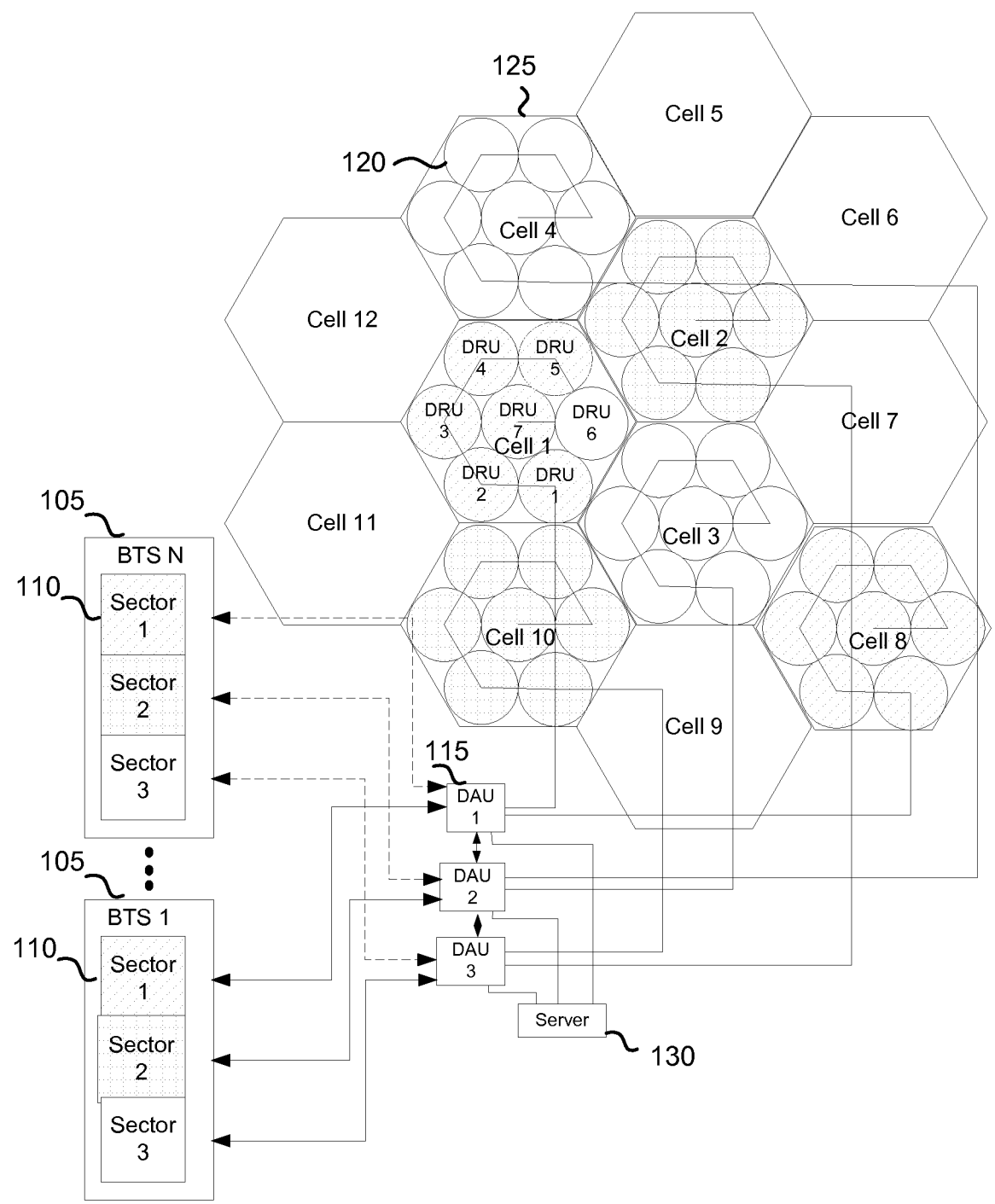
FIG. 4 is a high level schematic diagram illustrating a wireless network system comprising interconnected DAUs and multiple base station hotels, the network providing coverage to a geographical area according to an embodiment of the present invention.

As shown in FIG. 4, a load-balancing system may include multiple base stations (or multiple base station hotels) 105. The base stations may represent independent wireless network operators and/or multiple standards (WCDMA, LTE, etc.) or they may represent provision of additional RF carriers. The base station signals may be combined before they are connected to a DAU, as may be the case for a Neutral Host application. Different base stations 105 may be associated with the same, overlapping, non-overlapping or different frequency bands. Base stations 105 may be interconnected, e.g., to serve a geographic area. The interconnection may include a direct connection extending between the base stations (e.g., a cable) or an indirect connection (e.g., each base station connecting to a DAU, the DAUs being directly connected to each other). The greater number of base stations may increase the ability to add capacity for a given cell. Base stations 105 may represent independent wireless network operators and/or multiple standards (WCDMA, LTE, etc.), and/or they may represent provision of additional RF carriers. In some embodiments, base station signals are combined before they are connected to a DAU, as may be the case for a Neutral Host application. In one instance, as shown in FIG. 4, sectors from BTS 1 are directly coupled to the same DAUs and/or DRUs that are directly coupled to sectors to BTS N. In some other instances, one or more sectors from different BTS may be directly coupled to DAUs not shared by sectors of one or more other DAUs. Load balancing may or may not be applied differently to the different base stations 105. For example, if DRU 5 is reassigned from Sector 1 to Sector 2 in BTS 1, it may or may not be similarly reassigned in BTS N.

In order to efficiently utilize the limited base station resources, the network of DRUs should have the capability of re-directing their individual uplink and downlink signals to and from any of the BTS sectors. Because the DRUs data traffic has unique streams, the DAU Router has the mechanism to route the signal to different sectors.

Figure 5:
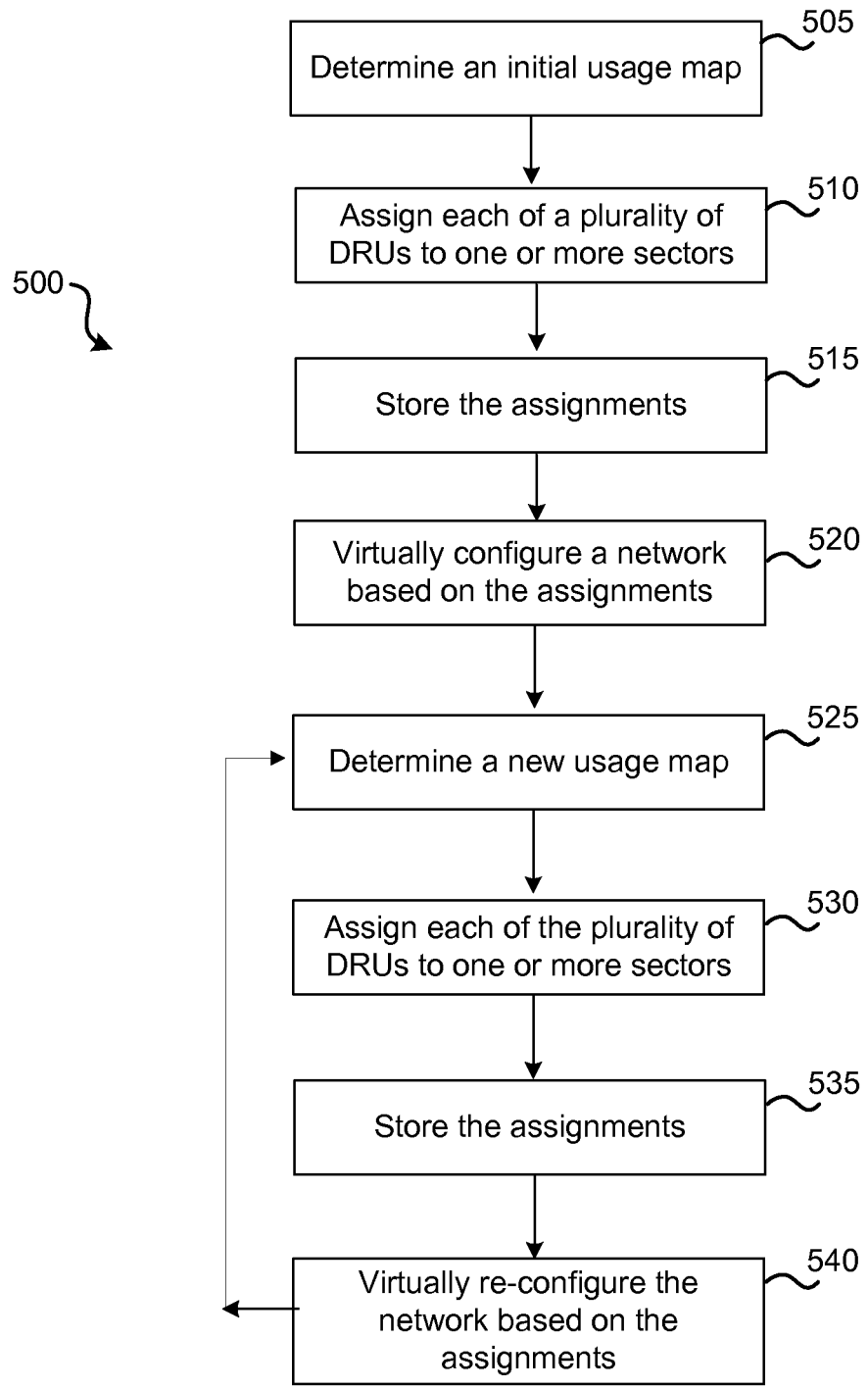
FIG. 5 is a high level flowchart illustrating a method of allocating network resources according to an embodiment of the present invention.

FIG. 5 illustrates a method 500 of allocating network resources across a geographical region according to an embodiment of the invention. At 505, an initial usage map may be determined. The usage map may include an actual or predicted use per spatial unit (and/or per temporal unit). The spatial unit may include: a Cell 125, a geographical region associated to a DRU 120, a sub-region in a Cell, or a sub-region within a geographical region associated with a DRU 120. For example, it may be predicted that a large number of users will attempt to use the network between 3 PM-4 PM ET within Cell 1. The map may also include an actual or predicted type of use (e.g., per-user bandwidth, per-spatial-unit bandwidth, whether the use is for a phone call or other data transmission, etc.). Thus, the spatial map may be generated to predict total requested resources across various spatial uses. The usage map may include an actual or predicted usage for each spatial/temporal unit on the map (e.g., each spatial unit within a network's coverage) or only a subset of the units. For example, in some embodiments, the map only includes predicted usages for spatial units predicted to be in high demand A usage map may be predicted in a variety of ways. For example, a system could monitor actual usage and detect temporal and spatial patterns, and/or a system could track devices associated with a network to identify where the devices are located (and thereafter predict that regions where many devices are located will receive many network requests). As another example, the map may be predicted based on common-sense habits (e.g., that fewer people will likely be in their offices in the evenings).

In some instances, a usage map is determined, not based on a prediction, but based on currently or recently identified usage. For example, the map could identify the current number of users connected to the network in each of a plurality of spatial units.

At 510, each of a plurality of DRUs 120 may be assigned to one or more sectors 110. The assignment may be determined based at least partly on the initial usage map determined at 505, default assignments and/or at least partly on a network's architecture. For example, one, more or all DRUs 120 in a network may have a default sector assignment. The default assignment may be determined based on a number of DAUs separating the DRU at issue from the sector at issue. For example, in FIG. 3, DRU 4 would be separated from Sector 1 by 1 DAU, but from Sector 3 by 3 DAUs. The default assignment may be determined based on a test communication between the DRU at issue and the sector at issue. For example, DRU 4 could send a test communication with each sector requesting a response signal, and the sector providing the highest quality of service to the users may be assigned to the DRU. The quality of service may be evaluated by assessing, e.g., a maximum system throughput, a highest number of users that can be provided with basic service, a percentage of users for which a service at or surpassing a particular quality level is available, an average or median signal quality available to users and/or an average or minimum quality of signal available to a percentage (e.g., 51%, 80% or 90%) of users. The default assignment may be the same as the most recent assignment.

Assignments may also or alternatively depend on the determined usage map. For example, in one instance, it may be predicted that the default assignments would lead to substantially more use of Sector 1's resources than the other sectors. One or more DRUs in Sector 1 may then be re-assigned to other sectors in an attempt to avoid this imbalance. In some instances, re-assignment always occurs to minimize resource imbalance. In some instances, re-assignment only occurs when a particular threshold (e.g., of imbalance or of resource requests sent to a sector) is or is predicted to be reached. In some instances, reassignment is at least partly or entirely determined based on other considerations, such as expected frequency interference, or predicted temporal variation in usage patterns, etc.

The selection of the DRUs to be reassigned may, for example, depend on: (1) determined use of an area associated with a DRU (e.g., re-assigning one or more DRUs associated with regions of the highest determined use, re-assigning one or more DRUs in an attempt to most evenly balance resource use, etc.); (2) maximizing the quality of service for the users in an area associated with a DRU; (3) cell association (e.g., attempting to cluster or avoid clustering of reassignments within select cells); (4) intra-cell location (e.g., attempting to re-assign DRUs associated with geographical locations that would be least likely to result in transmission interference following the assignment); and/or (5) whether the cell was recently re-assigned (e.g., attempting to maintain continuity between subsequent assignments).

In some embodiments, one or more DRUs is assigned to a plurality of sectors. For example, a DRU may always be assigned to a default sector (e.g., one separated by the fewest number of DAUs). The DRU may also be assigned to another sector based on analysis of the determined usage map. This analysis may include, e.g., any of the considerations presented above with regard to re-assignment considerations. In instances in which a DRU is assigned to a plurality of sectors, DRU assignments may include weights (e.g., indicating the percentage of a DRU's usage load that should be handled by each assigned sector).

At 515, the assignments may be stored. The assignments may be stored in a database, e.g., at a central server 130. The database may include time periods, spatial regions, DRU identifiers, and/or sector identifiers. For example, the database may indicate that from 10 AM-12 PM on Monday, DRUs 1-7 are assigned to sector 1, DRUs 8-14 are assigned to sector 2, etc. In some instances, the assignments are general assignments. For example, after learning about usage patterns, a system may develop day- and time-dependent assignments for all DRUs in a network, which may be completely or substantially static. As another example, assignments are repeatedly re-determined. For example, assignments may be based partly or completely on currently or recently observed usage.

At 520, a network is virtually configured based on the assignments. The configuring may allow select network components to be coupled (e.g., assigned sectors and DRUs) without requiring manipulating the network architecture or hardware. Thus, for example, indications may be sent to one or more DAUs 115 (e.g., over a wireless network or over a physical connection to the one or more DAUs) to indicate how the DAU should route received signals (e.g., downlink and/or uplink signals) and/or allocate sector resources. For example, a DAU 115 may be instructed to send signals from a DRU 120 directly to a sector and/or to another DAU 115. Conversely, a DAU 115 may be instructed to send signals from a sector directly to a DRU 120 and/or to another DAU 115. As explained in greater detail below, a signal received from or sent to a DRU may be encoded to allow for identification of the DRU (e.g., by encoding the DRU identity in a signal header, or by time division multiplexing the DRU signals), thereby allowing a DAU to determine how to route the signal. Similarly, a signal received from or sent to a sector may be encoded to allow for identification of the sector (e.g., by encoding the sector identity in a signal header), thereby allowing a DAU to determine how to route the signal. In one instance, the indications provide one or more DAUs with instructions as to particular DRUs that are to be supplied power from particular sectors.

At 525, a new usage map may be determined. For example, a new usage map may be determined at regular intervals (e.g., once an hour), when the sectors' resources are being unevenly used, when the use of one or more sectors' resources exceeds a threshold, etc. The new usage map may be determined in any of the ways as described above with respect to 505. The initial and new usage maps may be determined using the same, similar or different techniques.

At 530, DRUs are assigned to one or more sectors. The assignments may be completely new with respect to the assignments made at 510 or may include modifications of the assignments. The assignments may be made in any of the ways as described above with respect to 510. Assignment techniques may be the same, similar or different for the assignments at 510 and at 530. For example, the assignments at 530 may also or alternatively be based on geographical discrepancies in usage. In another example, both assignments are based on usage maps. In one embodiment, at least some assignments at 530 are different from corresponding assignments at 510. For example, one or more DRUs may be assigned to a sector separated by the fewest number of DAUs from the respective DRU in 510, while the same one or more DRUs may be assigned to another sector in 530 (e.g., to allow a more even distribution of use among sectors).

At 535, the assignments are stored. The assignments may be stored in a database, e.g., at a central server 130. The database may include time periods, spatial regions, DRU identifiers, and/or sector identifiers. The assignments may be stored in a same database as one storing assignments at 515. The assignments may replace previously stored assignments, or multiple sets of assignments may be stored. For example, each assignment set may be associated with a unique identifier, an iteration count, a time period, a trigger, etc. The stored assignments may include a complete assignment set (e.g., assigning each of all of the DRUs in a network to one or more sectors) or a partial assignment set. For example, assignments may only be stored if an assignment differs from a previous assignment or from a default assignment.

At 540, the network that was configured at 520 is virtually re-configured based on the assignments. The network may be re-configured in any manner as described with respect to 520. In some instances, the network is configured at 520 and re-configured at 540 in the same way. In some instances, the re-configuring is more efficient (e.g., only re-configuring elements that are changed based on the new assignments). In some instances, the network is only re-configured if the assignments at 530 differ from those at 510.

As shown in FIG. 5, the process may involve repeating one or more features. For example, 525-540 may be repeated, e.g., at regular time intervals or upon detecting a condition (e.g., network imbalance, above-threshold sector use, etc.).

Figure 6:
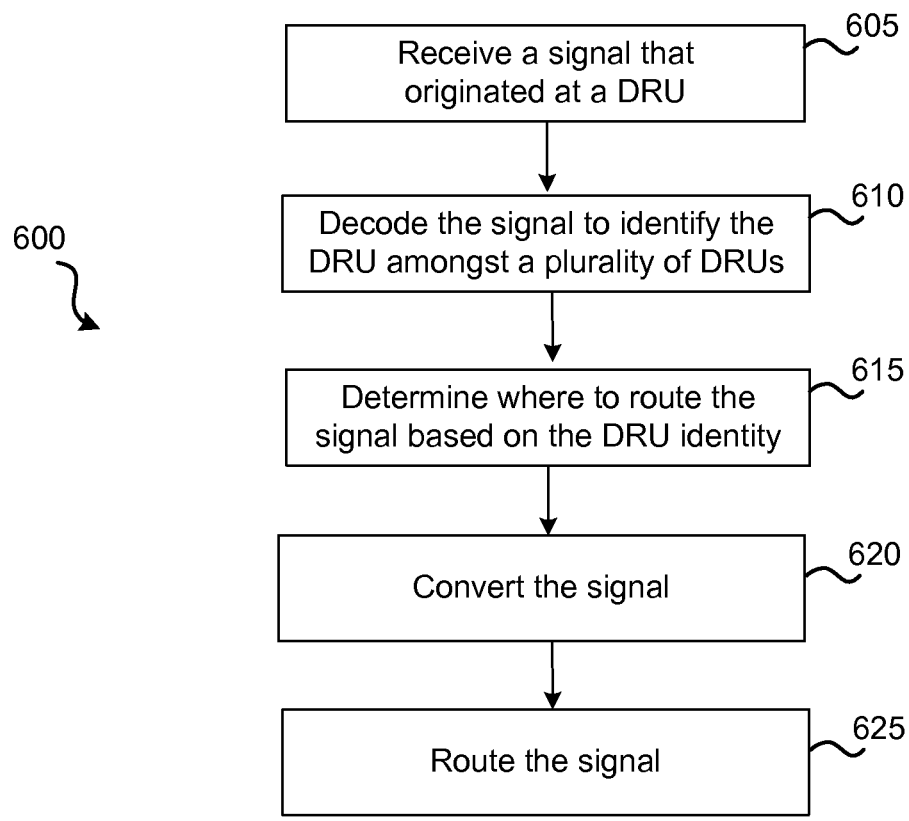
FIG. 6 is a high level flowchart illustrating a method of routing a DRU signal according to an embodiment of the present invention.

FIG. 6 illustrates a method 600 of routing a DRU signal according to an embodiment of the invention. At 605, a signal that originated at a DRU may be received (e.g., at a DAU). The signal may or may not be received directly from the DRU. For example, the signal may have been passed from a source DRU through one or more other DRUs and/or through one or more DAUs. The signal may be received via an optical-fiber transmission, Ethernet cable, etc. The signal may include, e.g., an optical signal or digital signal.

At 610, the signal may be decoded to identify the DRU at which the signal originated (i.e., the source DRU). This identification may include identifying one of a plurality of DRUs. The identification may include analyzing a header of the received signal, which may, e.g., include an identifier corresponding to the source DRU, or by time division multiplexing the DRU signals. For example, a DRU may receive a signal from a cell phone and convert/encode the signal such that the converted/encoded signal may be transmitted to a base station in a network. The DRU may further augment the converted/encoded signal with a header identifying the DRU, or by time division multiplexing the DRU signals. This augmented signal may then be transmitted to a connected DAU.

At 615, it may determined where to route the signal based on the DRU identity. This determination may be fully or partly based on assignments of one or more DRUs to one or more sectors. These assignments may be stored in a database, e.g., at a server connected to a DAU determining the routing. The routing may indicate, e.g., a final destination sector and/or an immediate routing. For example, in one instance, the routing may indicate that a signal from DRU 7 is to be routed to Sector 2. A DAU that received the signal may then determine how to route the signal based on the relative network location of the DAU and the final sector destination (e.g., whether the DAU is connected to the sector, or other DAUs that separate the DAU from the sector). In one instance, the routing may indicate that a signal from DRU 7 received at DAU 1 is to be routed to a downstream DAU or to DAU 2.

At 620, the signal may be converted. The signal may be converted from a signal type sent by DRUs to a signal type that may be received by sectors. For example, the signal may be converted from an optical or digital signal to an RF signal. In some embodiments, the signal is not converted. In some embodiments, the signal is only converted when it is received from a DRU (not from a DAU) or when it is to be routed directly to a sector (not to a DAU).

At 625, the signal may be routed in accordance with the determined routing. Thus, the signal may be routed, e.g., to one or more connected network components, such as a connected DAU and/or connected sector.

Figure 7:
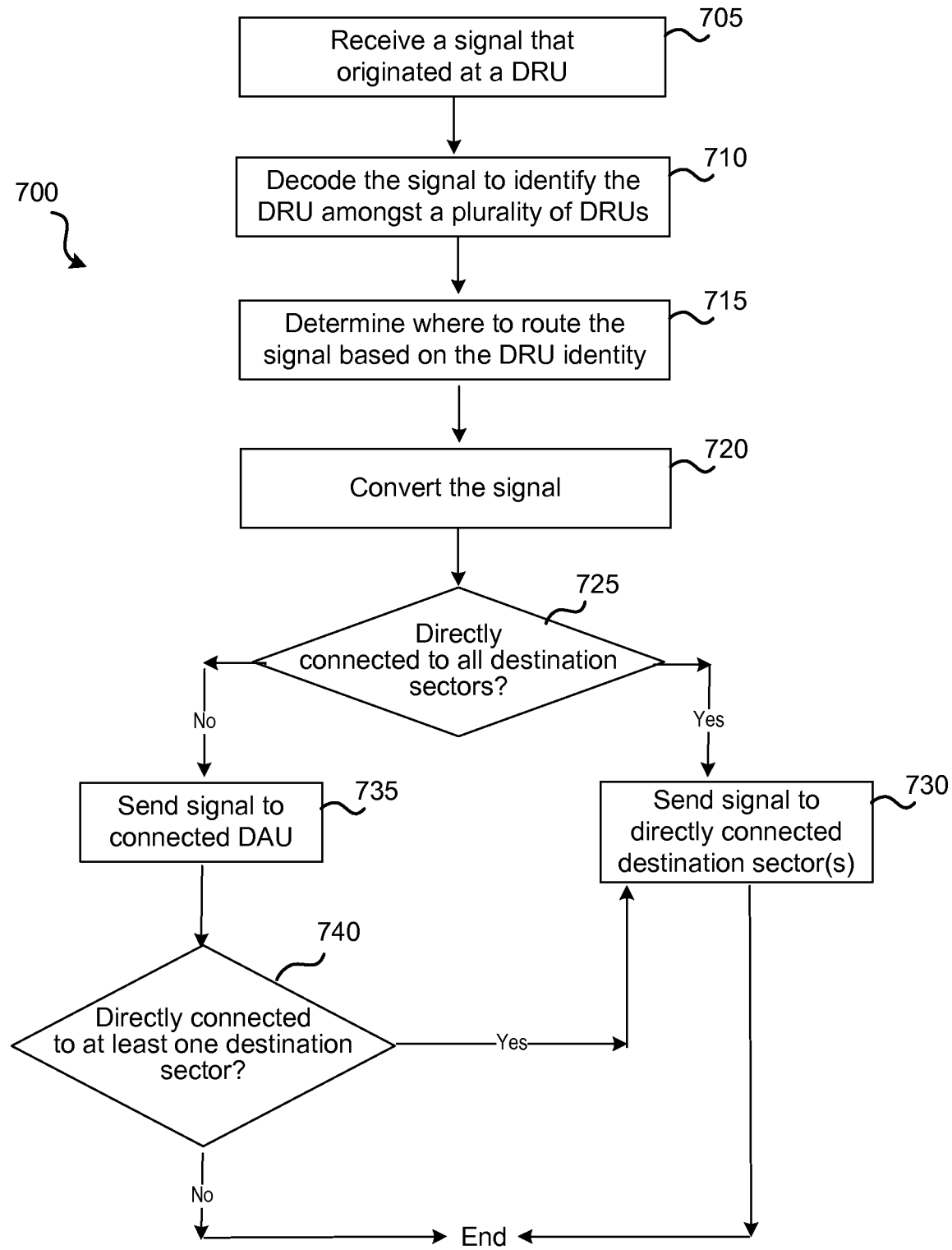
FIG. 7 is a high level flowchart illustrating a method of routing a DRU signal according to another embodiment of the present invention.

FIG. 7 illustrates another method 700 of routing a DRU signal according to an embodiment of the invention. FIG. 7's 705-720 parallel FIG. 6's 605-620. Thus, one, more or all of the above-presented embodiments may be applied to these features.

At 715, the determined routing may include identifying one or more destination sectors, which are to receive the signal. At 725, it may be determined whether a network component (e.g., a DAU) that received the signal at 705 is directly connected to all destination sectors. For example, it may be determined whether the DAU is directly connected via cable or fiber to all destination sectors and/or whether the DAU is connected to all destination sectors without any intermediate DAUs. If it is determined that the network component is directly connected to all destination sectors, the signal may be sent to the directly-connected destination sector(s) at 730.

Otherwise, the signal may be sent to a connected DAU at 735. In one embodiment, the signal is sent to a particular DAU (e.g., identified at 715). In one embodiment, the signal is sent to all DAUs directly connected to a network component (e.g., DAU) that received the signal at 705. In one embodiment, the signal is sent to a directly connected DAU that is categorized as being upstream or downstream from a network component (e.g., DAU) that received the signal at 705. At 740, it may then be determined whether the network component (e.g., a DAU) that received the signal at 705 is directly connected to at least one destination sector. If so, the signal may then be sent to the directly connected destination sector(s) at 730. Otherwise, process 700 may end with respect to the signal received at 705.

Figure 8:
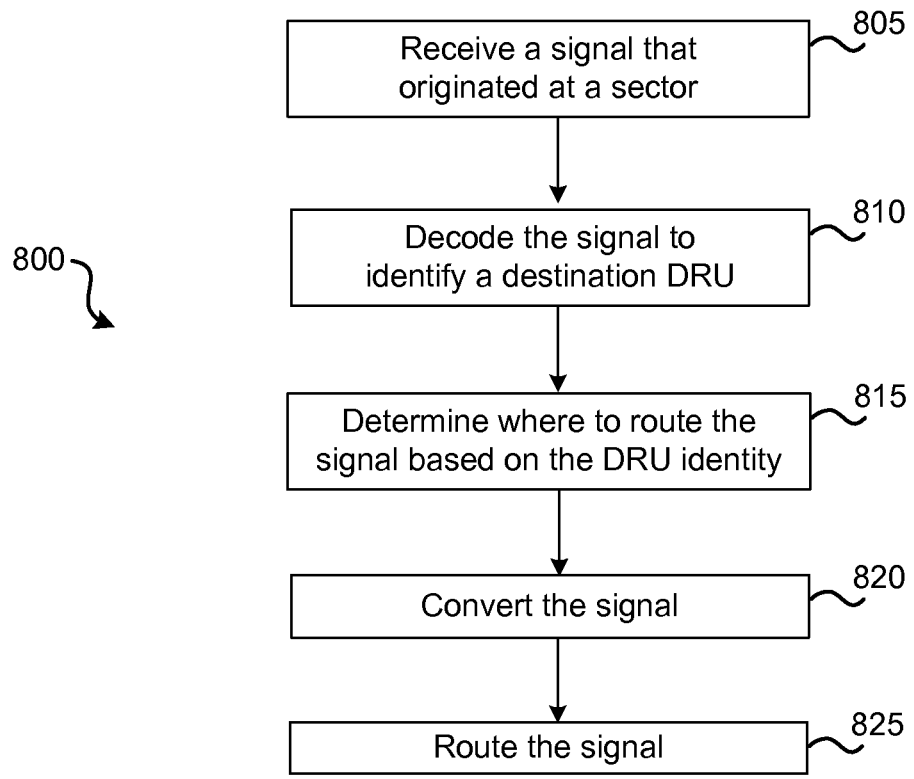
FIG. 8 is a high level flowchart illustrating a method of routing a sector signal according to an embodiment of the present invention.

FIG. 8 illustrates a method 800 of routing a sector signal according to an embodiment of the invention. At 805, a signal (e.g., a downlink RF signal) that originated at a sector may be received (e.g., at a DAU). The signal may or may not be received directly from the sector. For example, the signal may have been passed from a source sector through one or more DAUs. The signal may be received via an RF cable transmission.

At 810, the signal may be decoded to identify a destination DRU (e.g., a DRU that is to receive the signal). This identification may include identifying one of a plurality of DRUs. The identification may include analyzing a header of the received signal, which may, e.g., include an identifier corresponding to the source DRU, or by time division multiplexing the DRU signals. Each DAS may receive resources (e.g., RF carriers, Long Term Evolution Resource Blocks, Code Division Multiple Access codes or Time Division Multiple Access time slots) from a central base station including a plurality of sectors and distribute the resources to a plurality of digital remote units (DRUs). Routing tables in the DAUs and DRUs may be configured to identify where the signals will be routed.

At 815, it may determined where to route the signal based on the DRU identity. This determination may be fully or partly based on assignments of one or more DRUs to one or more sectors. These assignments may be stored in a database at a server connected to a DAU determining the routing. The routing may indicate, e.g., a final destination DRU and/or an immediate routing. For example, in one instance, the routing may indicate that a signal from Sector 2 may reach DRU 7 by transmitting the signal from DAU 2 to DAU 1 (which may then transmit the signal to reach DRU 7). In one instance, the routing may indicate that a signal from Sector 1 may reach DRU 7 by transmitting the signal from DAU 1 to DRU 1 (which may then transmit the signal to reach DRU 7).

At 820, the signal may be converted. The signal may be converted from a signal type sent by sectors to a signal type that may be received by DRUs. For example, the signal may be converted from an RF signal to an optical signal. In some embodiments, the signal is not converted. In some embodiments, the signal is only converted when it is received from a DRU (not from a DAU) or when it is to be routed directly to a sector (not to a DAU).

At 825, the signal may be routed in accordance with the determined routing. Thus, the signal may be routed, e.g., to one or more connected network components, such as a connected DAU and/or connected DRU.

Figure 9:
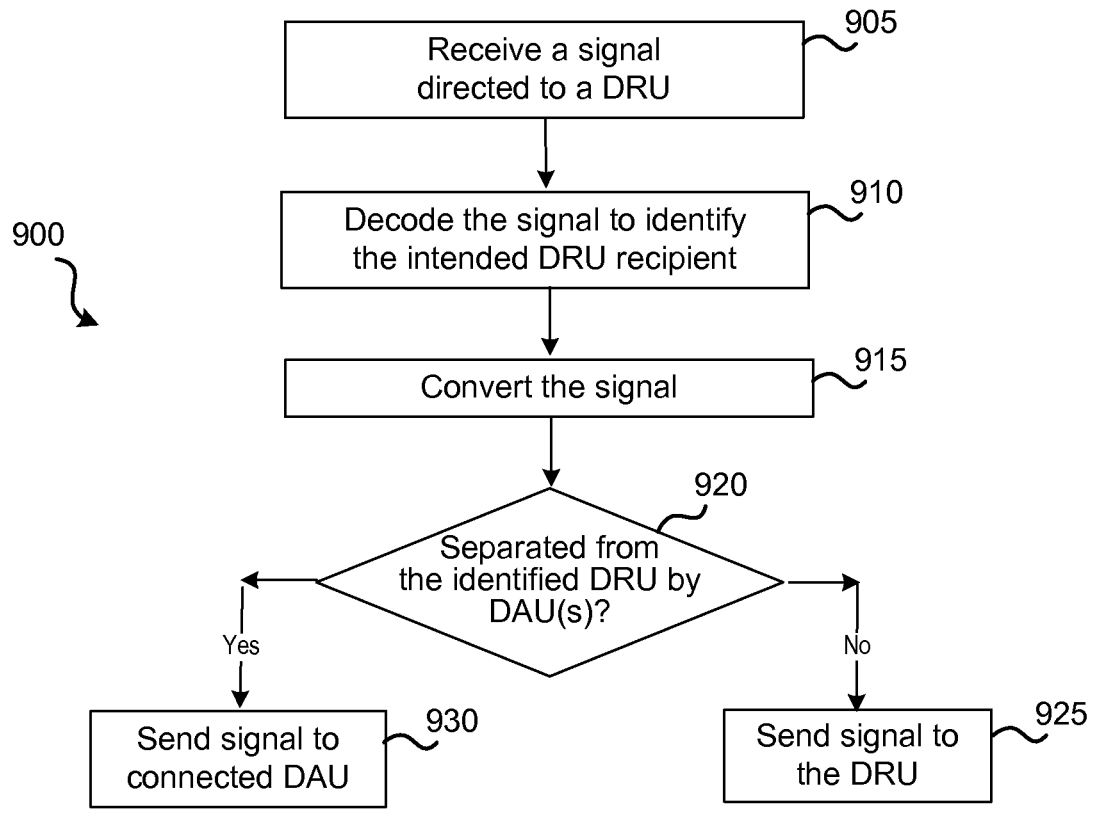
FIG. 9 is a high level flowchart illustrating a method of routing a sector signal according to another embodiment of the present invention.

FIG. 9 illustrates another method 900 of routing a sector signal according to an embodiment of the invention. FIG.

9's 905-915 parallel FIG. 8's 805-810 and 820. Thus, one, more or all of the above-presented embodiments may be incorporated into these elements. At 920, it may be determined whether a network entity (e.g., a DRU) that received the signal at 905 is separated from the identified DRU recipient by one or more DAU(s). If not, the signal may be sent to the identified DRU recipient at 925. For example, the signal may be sent to the DRU directly or to another DRU that is daisy-chained to the recipient DRU.

Otherwise, the signal may be sent to a connected DAU at 930. In one embodiment, the signal is sent to all DAUs connected to a network entity that received the signal at 905. In one embodiment, the network entity, or a server coupled thereto, selects a DAU to which the signal is to be sent based on a path separating the network entity from the recipient DRU. In one embodiment, a routing database indicates which DAU the signal is to be sent to, given a source and/or destination of the signal.

Dynamic assignments of DRUs to one or more sectors may lead to circumstances in which an assignment of a DRU during a first time period is different from an assignment of a DRU during a second, subsequent time period. A variety of techniques may be used to transition from the first assignment to the second assignment.

In one embodiment, the transition includes a hard hand off, in which the first assignment completely changes to the second assignment at a particular point in time. This transition time may include, e.g., upon determination of the second assignments, at a beginning of a time period associated with the second assignments, etc.

In one embodiment, the transition includes a modified hard hand off. The assignment may change as described above with respect to the hard hand off (e.g., at a particular time), but the transition may be modified in an attempt to avoid dropping calls. For example, signals associated with any calls on-going at the time of the transition may retain the first assignment, while any calls initiated after the transition may be associated with the second assignment.

In one embodiment, the transition includes a soft hand off, which may decrease the probability of dropping calls and/or data sessions in progress at a transition time. The soft transition may include identifying DRUs assigned to sectors different than a previous assignment, and determining a transition assignment for each DRU, wherein the transition assignment comprises an assignment to both an old and a new sector. The soft transition may include a duplicative unweighted transition. For example, if DRU 6 was previously assigned to Sector 1 and later assigned to Sector 2, signals could be transmitted from/to both sectors for an intermediate time period. The time period may or may not be fixed. For example, the time period may be seconds or the time period may be until the newly assigned sector has indicated that it has properly begun to receive/send signals.

In one embodiment, the transition includes a partial hand off. The partial transition may include identifying DRUs assigned to sectors different than a previous assignment, and determining a new assignment for each DRU, wherein the new assignment comprises an assignment to both an old and a new sector. Unlike the soft hand-off transition, the partial hand-off transition need not be temporary and can instead be maintained for a period of time or indefinitely. Signals may be transmitted from/to both the previous and new DRU at equal and/or full weights or the signals may be weighted. The partial hand-off transition may be advantageous, e.g., if a DRU is physically located near or at a sector's boundary.

In one embodiment, the transition includes a weighted soft hand off. The soft transition may gradually decrease weighting of signals received from/to one or more sectors initially assigned to a DRU and/or increasing weighting of signals received from/to one or more sectors subsequently assigned to the DRU.

Figure 10:
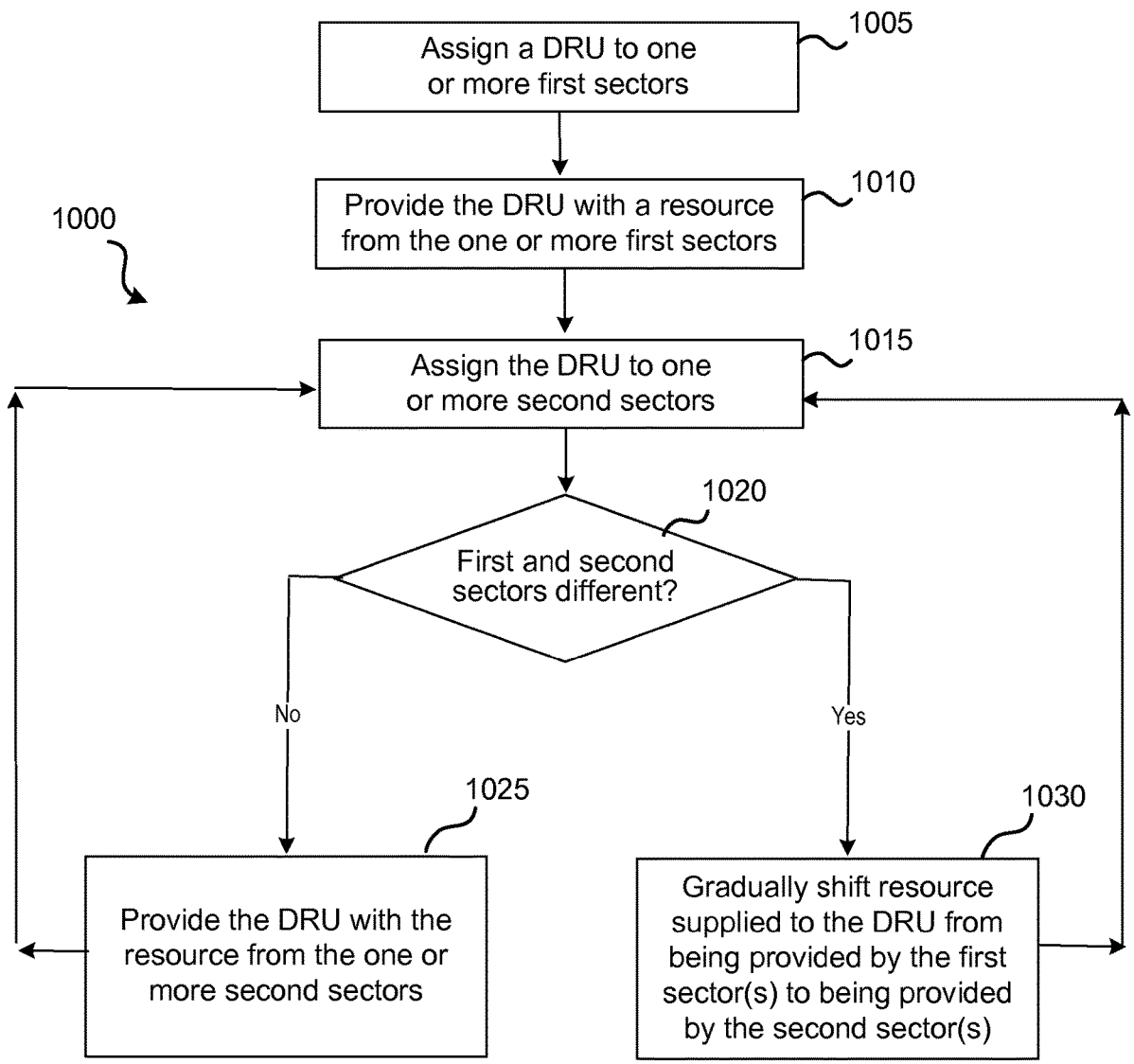
FIG. 10 is a high level flowchart illustrating a method of transitioning between subsequent DRU-sector assignments according to an embodiment of the present invention.

FIG. 10 illustrates a method 1000 of transitioning between subsequent DRU-sector assignments. At 1005, a DRU may be assigned to one or more first sectors. The assignment may be made using any of the techniques described herein. For example, the assignment may be based at least partly on default assignments and/or actual or predicted geographic use patterns.

At 1010, the DRU may be provided with a resource from the assigned one or more first sectors. Each DRU may receive resources (e.g., RF carriers, Long Term Evolution Resource Blocks, Code Division Multiple Access codes or Time Division Multiple Access time slots) from a central base station including a plurality of sectors and distribute the resources to a plurality of digital remote units (DRUB). In one embodiment, a resource associated with a sector (e.g., a frequency channel) is allocated to a DRU such that mobile devices located in an area surrounding the DRU will automatically connect to the sector and utilize the associated resource. The resource may be provided via connections (e.g., an RF connections, optical connection, digital connection, etc.) between the one or more first sectors and the DRU (e.g., via one or more DAUs).

At 1015, the DRU may be assigned to one or more second sectors. The assignment may be made using any of the techniques described herein. For example, the assignment may be based partly on default assignments and/or actual or predicted geographic use patterns. The first and second assignments may be made using the same or different techniques.

At 1020, it may be determined whether the first and second sectors are different. The determination may include, e.g., determining whether any second sector was not a first sector, whether any first sector is not a second sector, whether the first and second sectors are the same, whether none of the second sectors were a first sector, whether none of the first sectors is a second sector, etc. If it is determined that the sectors are not different, the DRU may be provided with the resource from the one or more second sectors at 1025 (e.g., as described with respect to 1010).

Otherwise, a soft hand-off may be performed at 1030 between the first and second sector(s). Specifically, the resource may gradually shift from being supplied by the first sector(s) to being supplied by the second sector(s). For example, the second sector(s) may receive an increasing amount of resource power from the DRU or an increasing number of frequency bands, while the first sector(s) may correspondingly receive a decrease in resource power. Mobile devices in an area surrounding the DRU may then detect a decreasing signal strength from the first sector(s) and switch any on-going communications to connect with the increasingly strong second sector(s). Thus, the mobile devices may then begin to second-sector resources as opposed to first-sector resources.

As shown in FIG. 10, the process may then repeat 1015-1030, continually re-assigning the DRU, determining whether the newly assigned sector(s) differ from the previously assigned sector(s), and appropriately adjusting resource supplies in view of the determination. Soft hand-offs between sectors may protect the network from dropping communications or calls, while simultaneously efficiently allocating resources (to improve data rates and decrease interference).

Figure 11:
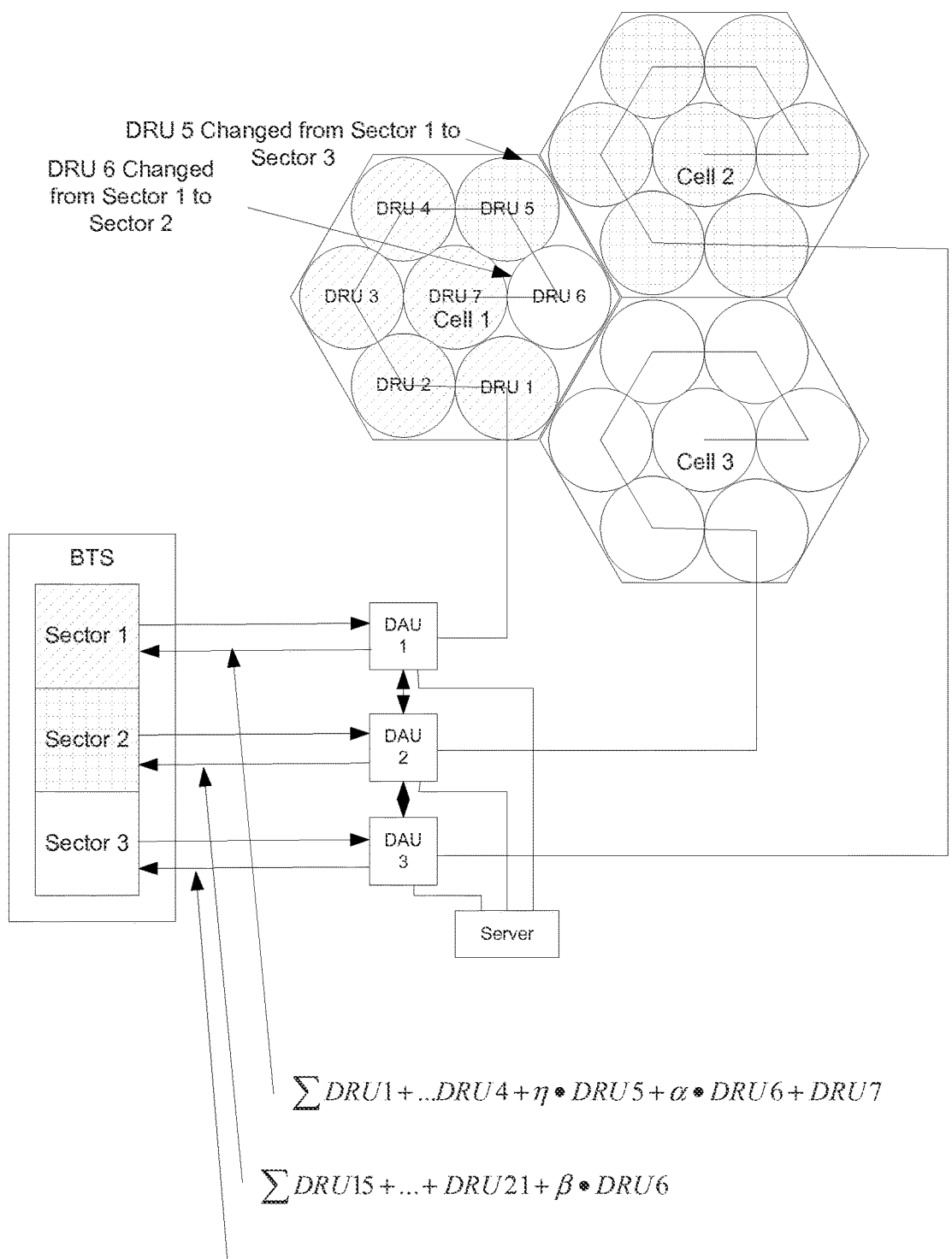
FIG. 11 is a high level schematic diagram illustrating a wireless network system transitioning between subsequent DRU-sector assignments according to an embodiment of the present invention.

FIG. 11 is a diagram illustrating a wireless network system 1100 using a soft-hand-off. In this example, DRU 5 is newly assigned to Sector 3, and DRU 6 is newly assigned to Sector 2. Both DRU 5 and DRU 6 were previously assigned to Sector 1. Based on network hardware and architecture, signals from DRUs 1-7 may be initially routed to DAU 1. DAU 1 may then determine how to route the signals by, e.g., any of the above-described techniques. In this embodiment, DAU 1 may identify transition assignments, based on the new assignments of DRUs 5 and 6. The transition assignments may include assignments to multiple sectors, each being associated with a gain factor (affecting an uplink or downlink path connectivity). For example, DRU 1 may gradually increase a gain of signals sent from DRUs 5 and 6 to DAU 2 (to thereafter send to Sector 2 or to DAU 3 to send to Sector 3), and/or DRU 1 may gradually decrease a gain of signals sent from DRUs 5 and 6 to Sector 1. The increase and decrease may be complementary, such that, e.g., a total gain of the DAU 5-6 signals (sent either to Sector 1 or to DAU 2) remains substantially or completely constant. The gain may vary, e.g., over a time period of about 1-60 seconds or about 1-5 minutes. Relatively short transition periods may improve network efficiency.

While not shown, DAUs may similarly adjust gains of signals received from sectors. Thus, for example, DAU 1 may receive a signal from Sector 1 for DRU 6 and from Sector 2 (via DAU 2) for DRU 6. DAU 2 may then adjust the gain of these signals (and, in some instances, combine the signals), and send the signal(s) to DRU 6 (via DRUs 1-5). In some embodiments, the gain of the signal from Sector 2 is adjusted at DAU 2 instead of DAU 1.

In one embodiment, gain coefficients are determined and/or stored for all DRU-Sector pairs in a network. The gain may be set to zero or one when no transition is in effect. In one embodiment, gain coefficients are only determined and/or stored for a subset of DRU-Sector pairs in a network. For example, they may only be determined for DRUs that have been assigned to one or more different sectors, as compared to a previous respective assignment.

Figure 12:
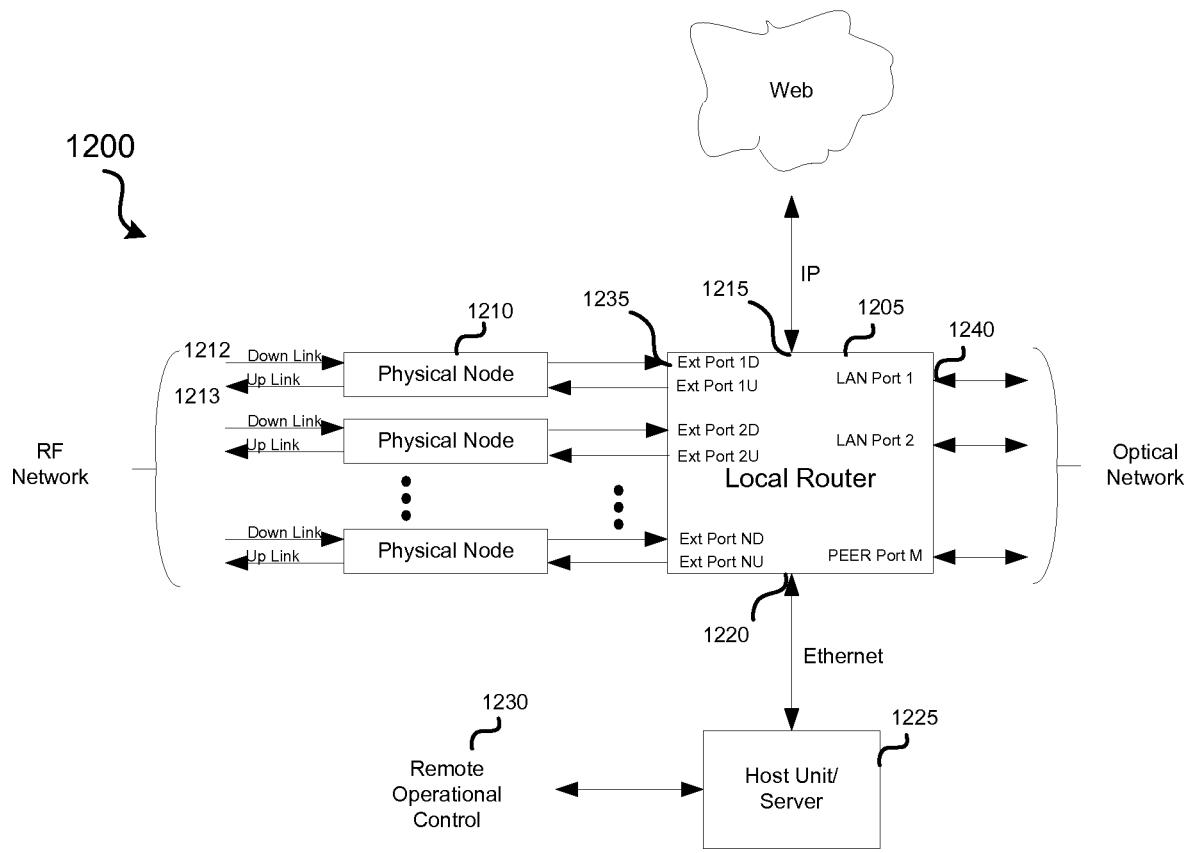
FIG. 12 is a high level schematic diagram illustrating a DAU according to an embodiment of the present invention.

FIG. 12 illustrates components of a DAU 1150 according to an embodiment of the invention. DAU 1150 may include a router (i.e., Local Router 1205). DAU 1150 may include one or more ports 1215 and 1220. Ports 1215 and 1220 may, e.g., enable DAU to connect to the Internet and/or a Host Unit or a server 1225 (e.g., Server 130). Server 1225 may at least partly configure the DAU and/or control the routing of the signals between various Local Router ports. Server 1225 may be, e.g., at least partly controlled by a remote operational control 1230 (e.g., to set re-assignment conditions, identify assignments, store assignments, input network configurations, receive/collect/analyze network usage, etc.).

DAU 1150 may include one or more physical nodes 1210, which may be coupled to Local Router 1205 by one or more first-end ports 1235. The physical nodes 1210 may translate the RF signals to baseband for the Downlink and from baseband to RF for the Uplink. The physical nodes 1210 may connect to the BTS at radio frequencies (RF). The physical nodes 1210 can be used for different operators, different frequency bands, different channels, or the like. The physical nodes 1210 can combine the downlink and uplink signals via a duplexer or they can keep them separate, as would be the case for a simplex configuration. The physical node 1210 can translate the signals from RF to baseband for the downlink path and from baseband to RF for the uplink path.

Each physical node 1210 may include one, two, or more ports, such as first-end ports, each of which may allow signals (e.g., RF signals and/or signals from/to a sector) to be received by or transmitted from DAU 1150. In some embodiments, a plurality of physical nodes 1210 each includes a Downlink port 1212 and an Uplink port 1213. In some embodiments, a physical node 1210 may also include an additional Uplink port, e.g., to handle a diversity connection. Output ports (e.g., Downlink port 1212 and Uplink port 1213) may be coupled to one or more ports (e.g., RF pots) of a base station. Thus, DAU 1150 may be physically coupled to a base station.

The Local Router 1205 directs the traffic between the various LAN Ports, PEER Ports and the External Ports. Local Router 1205 may include one or more second-end ports 1240, which may couple DAU 1150 to one or more DRUs or DAUs e.g., via an optical fiber, Ethernet cable, etc.). The second-end ports 1240 may include LAN or PEER ports. Second-end ports 1240 may be configured to send and/or receive signals, such as digital and/or optical signals. The router 1205 can direct the uplink data stream from the LAN and PEER ports to the selected External U ports. Similarly, the router 1205 can direct the downlink data stream from the External D ports to the selected LAN and PEER ports.

In one embodiment, at least one second-end port 1240 couples DAU 1150 to another DAU, and at least one second-end port 1240 couples DAU 1150 to a DRU. The local router may encode signals for transportation over the optical link as well as decodes the optical signals from the optical link. Physical Nodes may perform the function of translating the RF signals to baseband or translating the baseband signals to RF. The DAU can monitor traffic on the various ports and either route this information to a server or store this information locally.

Figure 13:
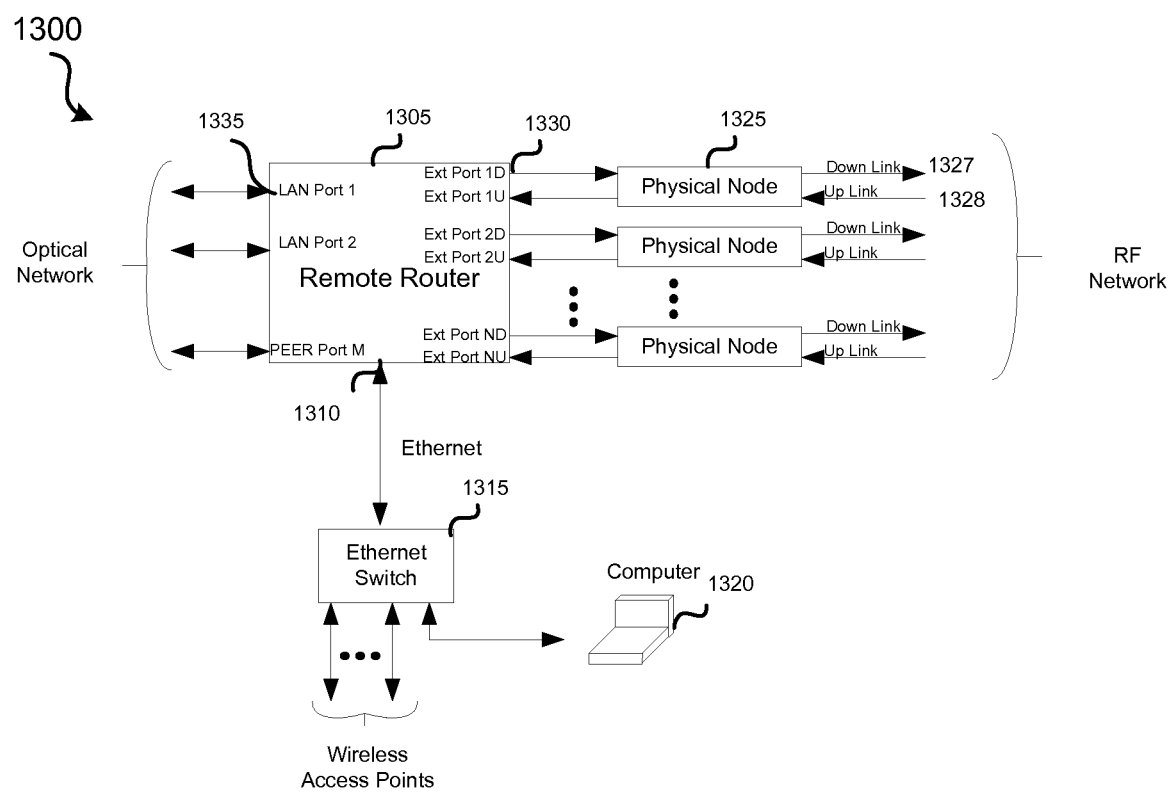
FIG. 13 is a high level schematic diagram illustrating a DRU according to an embodiment of the present invention.

FIG. 13 illustrates components of a DRU 1300 according to an embodiment of the invention. DRU 1300 may include a router (i.e., Remote Router 1305). DRU may include a network port 1310, which may allow DRU 1300 to couple (via an Ethernet Switch 1315) to a (e.g., wireless) network. Through the network, DRU 1300 may then be able to connect to a computer 1320. Thus, a remote connection may be established with DRU 1300.

Remote Router 1305 may be configured by a server, such as server 130, server 1225, a server connected to one or more DAUs, and/or any other server. Router 1305 can direct the downlink data stream from the LAN and PEER ports to selected External D ports. Similarly, router 1305 can direct the uplink data stream from the External U ports to selected LAN and PEER ports. Network port 1310 may be used as a Wireless access point for connection to the Internet. The Internet connection may, e.g., established at the DAU and Internet traffic may be overlaid with the data transport between the DRUs Physical Nodes and the DAU Physical Nodes.

DRU 1300 may include one or more physical nodes 1325. Physical nodes 1325 can be used for different operators, different frequency bands, different channels, etc. Physical nodes 1325 can translate the signals from RF to baseband for the uplink path and from baseband to RF for the downlink path. Each physical node 1325 may include one, two, or more ports, such as first-end ports 1330, each of which may allow for signals (e.g., RF signals and/or signals from mobile devices) to be received by or transmitted from DRU 1200. In some embodiments, a plurality of physical nodes 1325 each include one or more ports configured to send/receive signals (e.g., RF signals) from/to DRU 1300. The ports may include, e.g., a Downlink port 1327 and an Uplink port 1328. In some embodiments, an additional Uplink port exists for handling a diversity connection. Physical node ports (e.g., Downlink output port 1327 and Uplink output port 1328) may be connected to one or more antennas (e.g., RF antennas), such that signals may be received from and/or transmitted to, e.g., mobile wireless devices.

Remote Router 1305 may include one or more second-end ports 1335, which may couple DRU 1300 to one or more DAUs or DRUs. Second-end ports 1335 may include LAN or PEER ports, which may (e.g., physically) couple DRU 1300 to one or more DAUs or DRUs via an optical fiber.

It should be appreciated that the specific steps illustrated in FIGS. 5-10 provide particular methods according to an embodiment of the present invention. Other sequences of steps may also be performed according to alternative embodiments. For example, alternative embodiments of the present invention may perform the steps outlined above in a different order. Moreover, the individual steps illustrated in FIGS. 5-10 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 14:
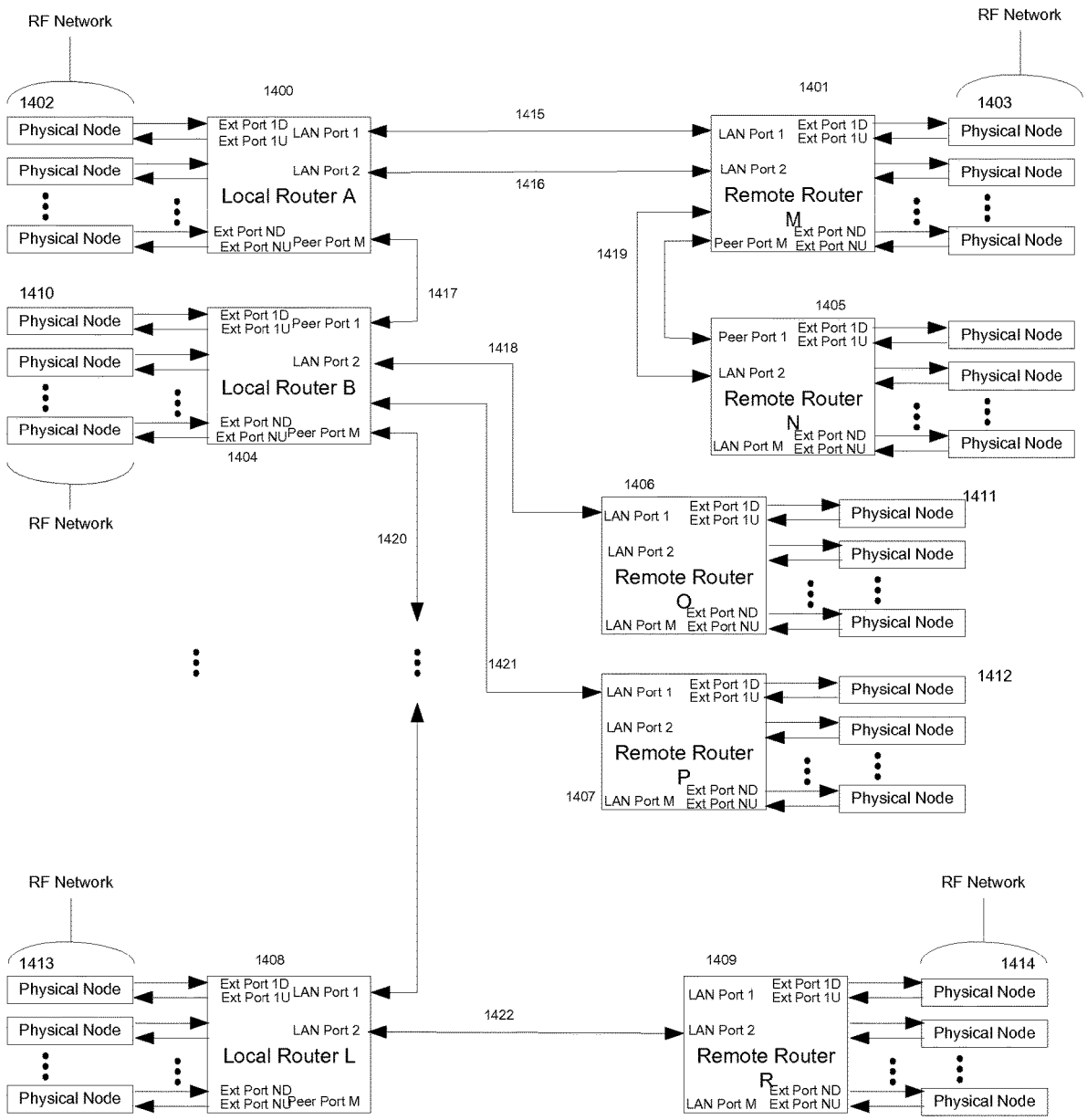
FIG. 14 depicts a typical topology where multiple Local Routers are interconnected with multiple Remote Routers according to an embodiment of the present invention.

FIG. 14 depicts a DAS network that includes multiple DAUs and multiple DRUs. The Local Routers are shown in a Daisy Chain configuration. The Remote Routers are shown in a star and daisy chain configuration. The local routers in the DAUs can be interconnected via a PEER port. The Local routers can connect to the remote routers in the DRUs via an optical or copper connection. The remote routers in the DRUs can be connected in a daisy chain configuration with other DRUs or they may be connected with a local router via a star configuration. The PEER ports in a DAU are used when there is no direct connection between a physical node connected to a local router's DAU and a physical node connected to a remote router DRU. PEER ports at the DRU are used for daisy chaining between two or more DRUs.

Figure 15:
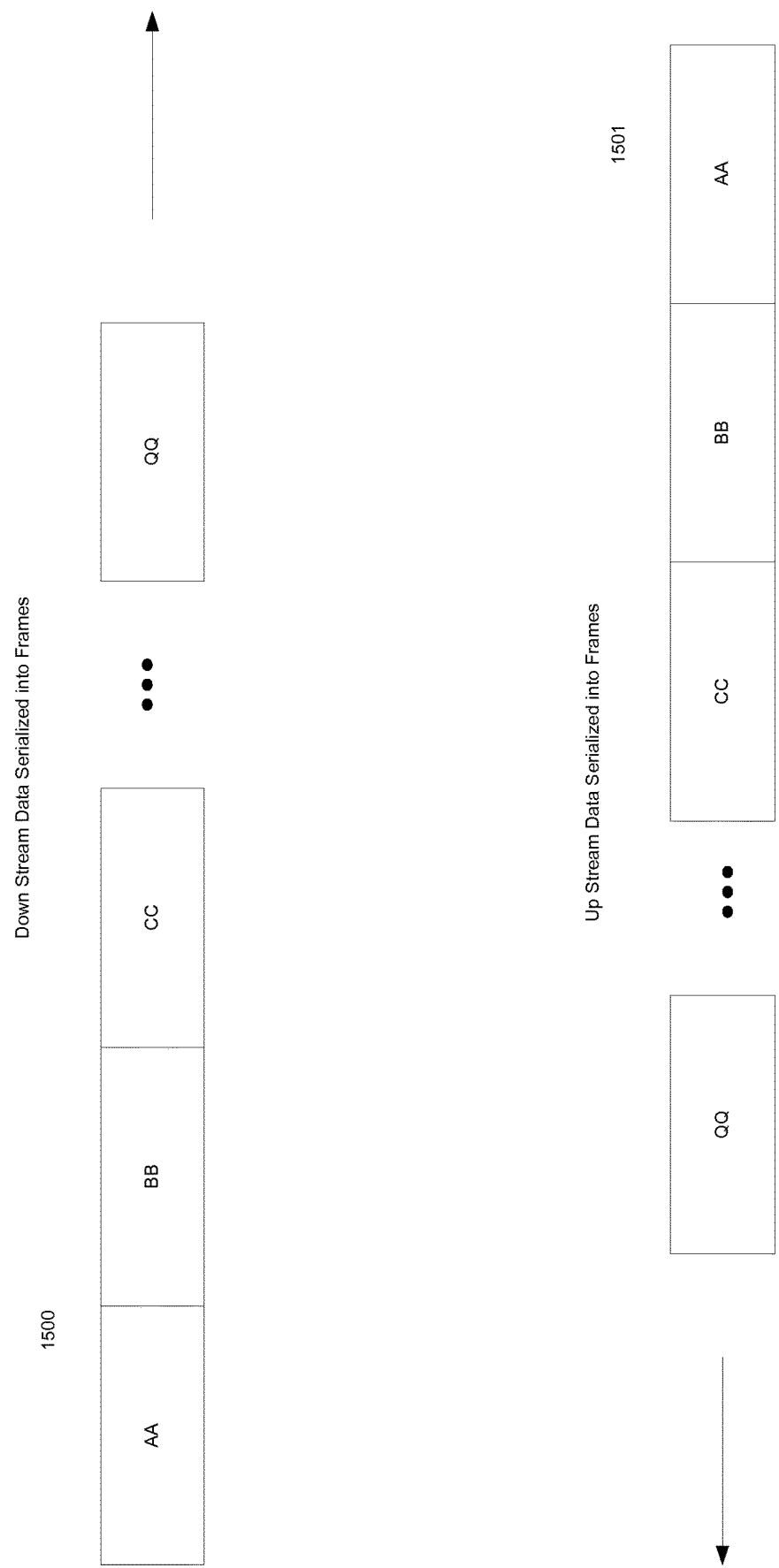
FIG. 15 shows an embodiment of the serialization of the data frames for the optical interconnections between the LAN and PEER ports according to an embodiment of the present invention.

FIG. 15 shows how the data stream of the downlink (1500) and uplink (1501) can be serialized for transportation between DAUs, DRUs and between DAU to DRU. In one embodiment the data is streamed using a protocol such as CPRI.

FIG. 16 provides the details of one embodiment of the Local Routers. The local router includes External Downlink and Uplink ports. It also includes LAN ports and PEER ports. The LAN ports are used to connect with DRUs on the network. The PEER ports are used to connect to other DAUs on the network. The Local Router Downlink table is used to establish the routing of the data traffic between the inputs and the outputs. The blacked out squares indicate a routing path. As an example, in FIG. 16, the External downlink input port 1D is routed to the MERGE input 1 of Merge block α and the PEER Port 1 input is routed to MERGE input 2 of Merge block α. The MERGE Port output of block α is sent to LAN Port 1 stream AA.

FIG. 16 shows one embodiment where there are 5 Merge blocks and 5 streams. The Local Router table would be configured for a given network of DAUs and DRUs. The router table demonstrates the routing of the Downlink signals between the External D ports to the LAN/PEER ports. The table can easily be extended to additional Merge blocks, additional External Inputs, additional LAN ports and additional PEER ports. The MERGE blocks can also have multiple inputs. The table can have multiple blacked out squares within a row but can have only one blacked out square within a column.

FIG. 17 provides the details of one embodiment of the Local Routers. The local router includes External Downlink and Uplink ports. It also includes LAN ports and PEER ports. The LAN ports are used to connect with DRUs on the network. The PEER ports are used to connect to other DAUs on the network. The Local Router Uplink table is used to establish the routing of the data traffic between the inputs and the outputs. The blacked out squares indicate a routing path. As an example, in FIG. 17 the LAN port 1 input of stream AA is routed to the MERGE input 1 of Merge block α. The PEER Port 1 input of stream AA is routed to Merge input 2 of Merge block α. The output of Merge block α is routed to external port 1U.

FIG. 17 shows an embodiment of the Local Router table for the Uplink signals. The Local Router table would be configured for a given network of DAUs and DRUs. The router table demonstrates the routing of the Uplink signals between the LAN/PEER ports and the External U ports. FIG. 17 shows one embodiment where there are 5 Merge blocks and 5 streams. The table can easily be extended to additional Merge blocks, additional External Inputs, additional LAN ports and additional PEER ports. The MERGE blocks can also have multiple inputs. The table can have multiple blacked out squares within a column but can have only one blacked out square within a row.

FIG. 18 provides the details of one embodiment of the Remote Routers. The remote router includes External Downlink and Uplink ports. It also includes LAN ports and PEER ports. The LAN ports are used to connect with DAUs on the network. The PEER ports are used to connect to other DRUs on the network. The Remote Router Downlink table is used to establish the routing of the data traffic between the inputs and the outputs. The blacked out squares indicate a routing path. As an example, in FIG. 18 the LAN port 1 input of stream AA is routed to the MERGE input 1 of Merge block α. The PEER Port 1 input of stream AA is routed to Merge input 2 of Merge block α. The output of Merge block α is routed to external port 1D.

FIG. 18 shows one embodiment where there are 5 Merge blocks and 5 streams. The table can easily be extended to additional Merge blocks, additional External Inputs, additional LAN ports and additional PEER ports. The MERGE blocks can also have multiple inputs. The table can have multiple blacked out squares within a column but can have only one blacked out square within a row.

FIG. 18 shows an embodiment of the Remote Router table for the downlink signals. The Remote Router table would be configured for a given network of DAUs and DRUs. The router table demonstrates the routing of the Downlink signals between the LAN/PEER ports and the External D ports.

FIG. 19 provides the details of one embodiment of the Remote Routers. FIG. 19 shows an embodiment of the Remote Router table for the uplink signals. The Remote Router table would be configured for a given network of DAUs and DRUs. The router table demonstrates the routing of the Uplink signals between the External U ports and the LAN/PEER Ports. The remote router includes External Downlink and Uplink ports. It also includes LAN ports and PEER ports. The LAN ports are used to connect with DAUs on the network. The PEER ports are used to connect to other DRUs on the network. The Remote Router Uplink table is used to establish the routing of the data traffic between the inputs and the outputs. The blacked out squares indicate a routing path. As an example, in FIG. 19 the External uplink input port 1U is routed to the MERGE input 1 of Merge block α and the PEER Port 1 input is routed to MERGE input 2 of Merge block α. The MERGE Port output of block α is sent to LAN Port 1 stream AA.

FIG. 19 shows one embodiment where there are 5 Merge blocks and 5 streams. The table can easily be extended to additional Merge blocks, additional External Inputs, additional LAN ports and additional PEER ports. The MERGE blocks can also have multiple inputs. The table can have multiple blacked out squares within a row but can have only one blacked out square within a column.

Figure 20:
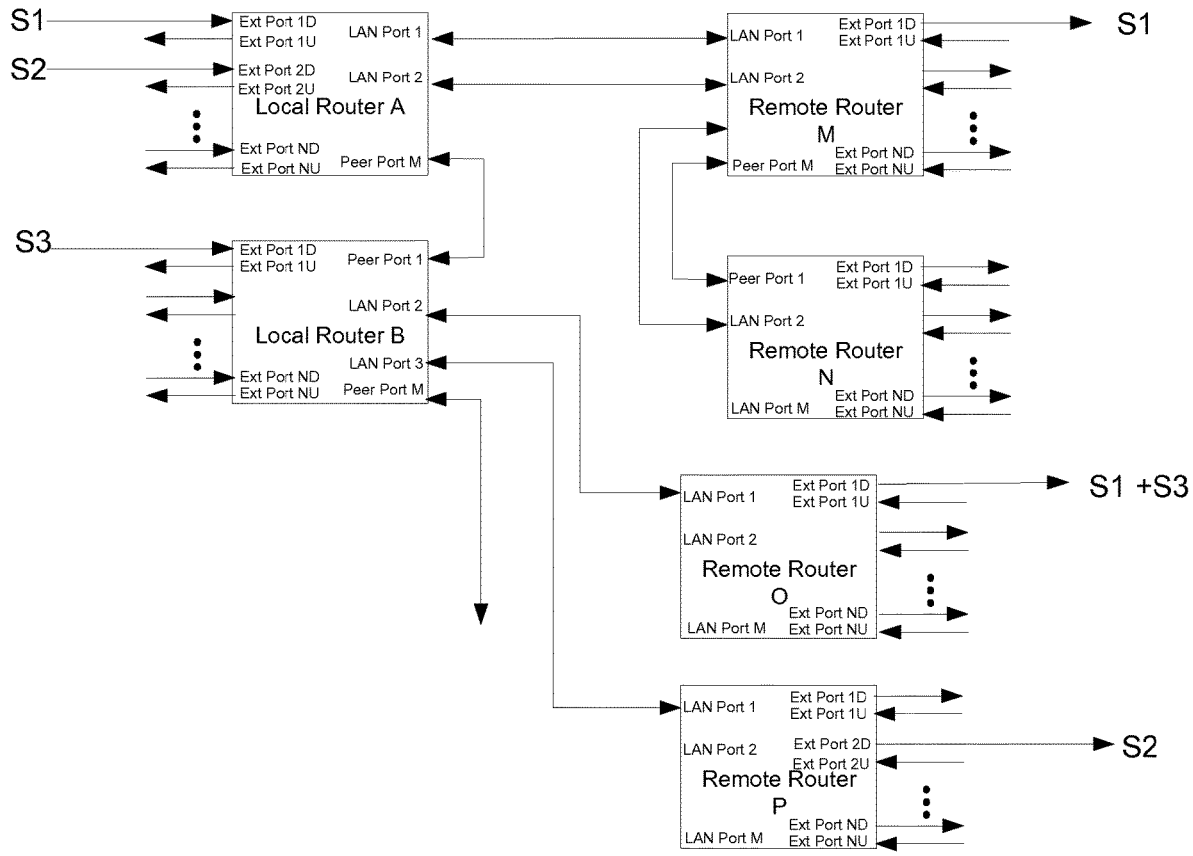
FIG. 20 shows 3 examples of routing Downlink signals over the network of DAUs and DRUs according to an embodiment of the present invention.

FIG. 20 provides some examples of the routing of traffic through one embodiment of the network. In the tables, operational code is used to configure the local and remote routers. FIG. 21 shows 3 examples of routing Downlink signals over the network of DAUs and DRUs. The tables demonstrate an embodiment of an operational code that could be used to set each of the Router tables.

In table 1, the downlink data input S1 at External Port 1D of Local Router A is routed to the External Port 1D of Remote router M. LAN Port 1 is used to stream the data between the Local router A and the Remote router M.

In table 2, the downlink data input S2 at External Port 2D of Local Router A is routed to the External Port 2D of Remote router P. PEER Port M of Local router A is used to stream the downlink signal S2 to PEER port 1 of Local router B. LAN Port 3, stream BB is used to communicate with LAN port 1 of Remote router P. The input of LAN Port 1 stream BB is routed to External Port 2D in Remote router P.

In table 3, the downlink data input S1 at External Port 1D of Local Router A is routed to the PEER Port M stream AA. The output from PEER Port M, stream AA of Local Router A is input to PEER Port 1 of Local Router B. PEER Port 1, stream AA of Local Router B is sent to input 1 of Merge block α. The downlink data input S3 at External Port 1D of Local Router B is routed to input 2 of Merge block α. The output of Merge block α is routed to LAN Port 2, stream AA of Local router B. LAN Port 2, of Local Router B transports data to LAN Port 1 of Remote Router O. The input data from LAN Port 2, of Remote Router O is routed to External Port 1D.

Figure 22:
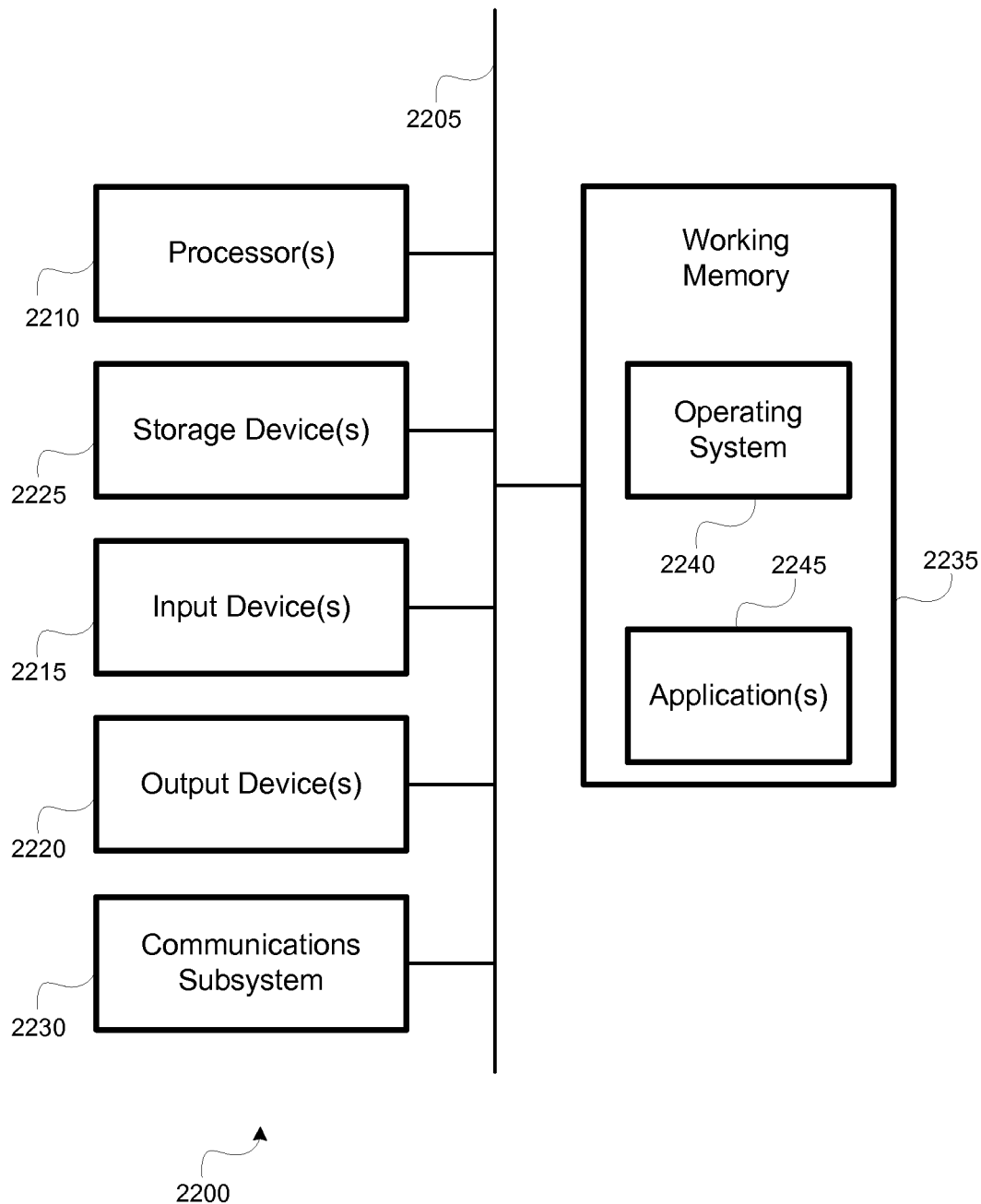
FIG. 22 is a high level schematic diagram illustrating a computer system according to an embodiment of the present invention.

FIG. 21 provides some examples of the routing of traffic through one embodiment of the network. In the tables, operational code is used to configure the local and remote routers. FIG. 22 shows 3 examples of routing Uplink signals over the network of DAUs and DRUs. The tables demonstrate an embodiment of an operational code that could be used to set each of the Router tables.

In table 1, the Uplink data input S3 at External Port 1U of Remote Router O is routed to LAN Port 1. LAN Port 1, stream AA of Remote Router O is used to stream the data between LAN Port 1, stream AA of Remote router O and LAN Port 2, Stream AA of Local router B. The input to LAN Port 2, stream AA of Local router B is routed to external Port 1U.

In table 2, the uplink data input S4 at External Port 2U of Remote Router P is routed to LAN Port 1, stream BB of Remote router P. LAN Port 1, stream BB of Remote router P is used to stream the uplink signal S4 to LAN port 3, stream BB of Local router B. LAN Port 3, stream BB is routed to PEER port 1, stream BB of Local router B. PEER Port 1, stream BB of Local router B transports data to LAN Port M, stream BB of Local router A. The input of PEER Port 1 stream BB is routed to External Port 2U in Local router A.

In table 3, the uplink data input S2 at External Port 1U of Remote Router N is routed to the PEER Port 1, stream AA of Remote router N. The output from PEER Port 1, stream AA of Remote Router N is input to PEER Port M of Remote Router M. PEER Port M, stream AA of Remote Router M is sent to input 1 of Merge block α. The uplink data input S1 at External Port 1U of Remote Router M is routed to input 2 of Merge block α. The output of Merge block α is routed to LAN Port 1, stream AA of Remote router M. LAN Port 1, of Remote Router M transports data to LAN Port 1 of Local Router A. The input data from LAN Port 1, of Local Router A is routed to External Port 1U of Local router A.

Methods shown in FIG. 5-10 or elsewhere described may be performed by a variety of devices or components. For example, some processes may be performed solely or partly by one or more DAUs. Some processes may be performed solely or partly by a remote computer, e.g., coupled to one or more DAUs. Some processes may be performed by one or more DRUs. In some embodiments, shown or described process may be performed by multiple devices or components (e.g., by multiple DAUs, by one DAU and a remote server, by one or more DRUs and a DAU, etc.).

Above-described embodiments may be implemented with, e.g. distributed base stations, distributed antenna systems, distributed repeaters, mobile equipment and wireless terminals, portable wireless devices, and/or other wireless communication systems such as microwave and satellite communications. Many variations are possible. For example, embodiments including a single base station may be applied in systems including multiple, interconnected base stations. Embodiments may be modified to replace daisy-chain configurations with star configurations or the converse. Embodiments showing a single server (e.g., connected to a plurality of DAUs) may be modified to include a plurality of servers (e.g., each connected to a different DAU or connected to all DAUs).

Embodiments herein allow for loads to be balanced across base station sectors. Finite base station resources may then be repeatedly redistributed across geographical areas, so as to efficiently provide coverage to a large area. The load balancing may also protect base station sectors from overload and excess resource taxation upon a large accumulation of wireless users within a small number of cells (e.g., many users congregating at an enterprise lunch room at lunchtime or users congregating on a highway during rush hour).

FIG. 22 is a high level schematic diagram illustrating a computer system 2200 including instructions to perform any one or more of the methodologies described herein. One or more of the above-described components (e.g., DAU 115, DRU 120, server 130, server 1225, computer 1320, etc.) may include part or all of computer system 2200. System 2200 may also perform all or part of one or more methods described herein. FIG. 22 is meant only to provide a generalized illustration of various components, any or all of which may be utilized as appropriate. FIG. 22, therefore, broadly illustrates how individual system elements may be implemented in a relatively separated or relatively more integrated manner.

The computer system 2200 is shown comprising hardware elements that can be electrically coupled via a bus 2205 (or may otherwise be in communication, as appropriate). The hardware elements may include one or more processors 2210, including without limitation one or more general-purpose processors and/or one or more special-purpose processors (such as digital signal processing chips, graphics acceleration processors, and/or the like); one or more input devices 2215, which can include without limitation a mouse, a keyboard and/or the like; and one or more output devices 2220, which can include without limitation a display device, a printer and/or the like.

The computer system 2200 may further include (and/or be in communication with) one or more storage devices 2225, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 2200 might also include a communications subsystem 2230, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 2230 may permit data to be exchanged with a network (such as the network described below, to name one example), other computer systems, and/or any other devices described herein. In many embodiments, the computer system 2200 will further comprise a working memory 2235, which can include a RAM or ROM device, as described above.

The computer system 2200 also can comprise software elements, shown as being currently located within the working memory 2235, including an operating system 2240, device drivers, executable libraries, and/or other code, such as one or more application programs 2245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 2225 described above. In some cases, the storage medium might be incorporated within a computer system, such as the system 2200. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 2200 and/or might take the form of source and/or installable code, which, upon compilation and/or installation on the computer system 2200 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 2200) to perform methods in accordance with various embodiments of the invention. According to a set of embodiments, some or all of the procedures of such methods are performed by the computer system 2200 in response to processor 2210 executing one or more sequences of one or more instructions (which might be incorporated into the operating system 2240 and/or other code, such as an application program 2245) contained in the working memory 2235. Such instructions may be read into the working memory 2235 from another computer-readable medium, such as one or more of the storage device(s) 2225. Merely by way of example, execution of the sequences of instructions contained in the working memory 2235 might cause the processor(s) 2210 to perform one or more procedures of the methods described herein.

The terms "machine-readable medium" and "computer-readable medium," as used herein, refer to any medium that participates in providing data that causes a machine to operate in a specific fashion. Computer readable medium and storage medium do not refer to transitory propagating signals. In an embodiment implemented using the computer system 2200, various computer-readable media might be involved in providing instructions/code to processor(s) 2210 for execution and/or might be used to store such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 2225. Volatile media include, without limitation, dynamic memory, such as the working memory 2235.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, etc.

The embodiments described herein may be implemented in an operating environment comprising software installed on any programmable device, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

It is also understood that the examples and embodiments described herein are for illustrative purposes only and that various modifications or changes in light thereof will be suggested to persons skilled in the art and are to be included within the spirit and purview of this application and scope of the appended claims.

Appendix I is a glossary of terms used herein, including acronyms.

APPENDIX I

Glossary of Terms

ACLR Adjacent Channel Leakage Ratio
ACPR Adjacent Channel Power Ratio
ADC Analog to Digital Converter
AQDM Analog Quadrature Demodulator AQM Analog Quadrature Modulator
AQDMC Analog Quadrature Demodulator Corrector
AQMC Analog Quadrature Modulator Corrector
BPF Bandpass Filter
CDMA Code Division Multiple Access
CFR Crest Factor Reduction
DAC Digital to Analog Converter
DET Detector
DHMPA Digital Hybrid Mode Power Amplifier
DDC Digital Down Converter
DNC Down Converter
DPA Doherty Power Amplifier
DQDM Digital Quadrature Demodulator
DQM Digital Quadrature Modulator
DSP Digital Signal Processing
DUC Digital Up Converter
EER Envelope Elimination and Restoration
EF Envelope Following
ET Envelope Tracking
EVM Error Vector Magnitude
FFLPA Feedforward Linear Power Amplifier
FIR Finite Impulse Response
FPGA Field-Programmable Gate Array
GSM Global System for Mobile communications
I-Q In-phase/Quadrature
IF Intermediate Frequency
LINC Linear Amplification using Nonlinear Components
LO Local Oscillator
LPF Low Pass Filter
MCPA Multi-Carrier Power Amplifier
MDS Multi-Directional Search
OFDM Orthogonal Frequency Division Multiplexing
PA Power Amplifier
PAPR Peak-to-Average Power Ratio
PD Digital Baseband Predistortion
PLL Phase Locked Loop
QAM Quadrature Amplitude Modulation
QPSK Quadrature Phase Shift Keying
RF Radio Frequency
RRH Remote Radio Head
RRU Remote Radio Head Unit
SAW Surface Acoustic Wave Filter
UMTS Universal Mobile Telecommunications System
UPC Up Converter
WCDMA Wideband Code Division Multiple Access
WLAN Wireless Local Area Network

What is claimed is:

1. A distributed antenna system comprising:
a plurality of Digital Remote Units (DRUs) configured to send and receive wireless radio signals;
a plurality of sectors, each configured to send and receive wireless radio signals;
a plurality of inter-connected Digital Access Units (DAUs), each configured to communicate with at least one of the DRUs via optical signals, and each being coupled to at least one of the sectors; and
a processor configured to:
assign a DRU of the plurality of DRUs to a first sector of the plurality of sectors,
reassign the DRU to a second sector of the plurality of sectors, the second sector being different from the first sector;
gradually decreasing a first gain of signals sent from the DRU to the first sector, and
gradually increasing a second gain of signals sent from the DRU to the second sector,
wherein gradually decreasing the first gain and gradually increasing the second gain shifts a resource from being supplied by the first sector to being supplied by the second sector, and wherein the first sector is associated with a first carrier, the second sector is associated with a second carrier, and a first power of the first carrier to the DRU is controlled independently of a second power of the second carrier to the DRU.

2. The distributed antenna system of claim 1, wherein the gradual decreasing and the gradual increasing are nonlinear.

3. The distributed antenna system of claim 1, wherein the plurality of DRUs is connected in a loop to the plurality of DAUs.

4. The distributed antenna system of claim 1, wherein a single DAU port is coupled the plurality of sectors.

5. The distributed antenna system of claim 1, further comprising a server configured to route signals between the plurality of DAUs.

6. The distributed antenna system of claim 1, wherein a Base Transceiver Station includes the plurality of sectors.

7. The distributed antenna system of claim 1, wherein each of the plurality of DAUs is configured to communicate with the at least one of the plurality of DRUs by sending and receiving signals over at least one of an optical fiber, an Ethernet cable, microwave line-of-sight link, wireless link, or satellite link.

8. The distributed antenna system of claim 1, wherein each of the plurality of DAUs is further configured to convert a radio signal received from the at least one sector to an optical signal.

9. The distributed antenna system of claim 1, wherein each of the plurality of DAUs is co-located with the at least one sector.

10. The distributed antenna system of claim 1, wherein each of the plurality of DAUs is connected to the plurality of DRUs.

11. The distributed antenna system of claim 1, wherein at least some of the plurality of DRUs are connected in a daisy chain configuration.

12. The distributed antenna system of claim 1, wherein the plurality of DRUs is connected to the plurality of DAUs in a star configuration.

13. The distributed antenna system of claim 1, further comprising a dynamic database comprising sector assignments for each of the plurality of DRUs, wherein the database is accessible by the plurality of DAUs.

14. A method comprising:
assigning a Digital Remote Unit (DRU) to a first sector of a plurality of sectors;
receiving a resource at the DRU from the first sector;
receiving a first optical signal at a first Digital Access Unit (DAU) from the DRU;
converting the first optical signal to a first radio signal;
transmitting the first radio signal to the first sector;
reassigning the DRU to a second sector of the plurality of sectors, the second sector being different from the first sector;
adjusting the resource allocated to the DRU by:
gradually decreasing a first gain of the signals sent from the DRU to the first sector, and
gradually increasing a second gain of signals sent from the DRU to the second sector,
wherein gradually decreasing the first gain and gradually increasing the second gain shifts the resource from being supplied by the first sector to being supplied by the second sector, and wherein the first sector is associated with a first carrier, the second sector is associated with a second carrier, and a first power of the first carrier to the DRU is controlled independently of a second power of the second carrier to the DRU;

receiving the resource at the DRU from the second sector;

receiving a second optical signal at the first DAU from the DRU;

transmitting the second optical signal from the first DAU to a second DAU;

converting the second optical signal to a second radio signal; and transmitting the second radio signal to the second sector.

15. The method of claim 14, wherein the reassignment is based at least partly on an actual or predicted increased use of Distributed Antenna System that includes at least the DRU.

16. The method of claim 14, further comprising:
storing the assignment in a database; and
updating the database to include the reassignment.

17. The method of claim 14, wherein a hardware architecture of a Distributed Antenna System that includes at least the DRU is not modified between the assignment and the reassignment.

* * * * *